US010957086B1

(12) United States Patent
Mathon et al.

(10) Patent No.: US 10,957,086 B1
(45) Date of Patent: Mar. 23, 2021

(54) VISUAL AND DIGITAL CONTENT OPTIMIZATION

(71) Applicant: ACCENTURE GLOBAL SOLUTIONS LIMITED, Dublin (IE)

(72) Inventors: Edouard Mathon, Antibes (FR); Christian Souche, Cannes (FR); Victor Chevalier, Strasbourg (FR); Robi Fazio, Le Cannet (FR)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 0 days.

(21) Appl. No.: 17/001,305

(22) Filed: Aug. 24, 2020

(30) Foreign Application Priority Data

Jun. 25, 2020 (EP) .................................. 20305701.3

(51) Int. Cl.
| | |
|---|---|
| *G06T 11/60* | (2006.01) |
| *G06K 9/62* | (2006.01) |
| *G06K 9/46* | (2006.01) |
| *G06N 20/00* | (2019.01) |
| *G06Q 30/02* | (2012.01) |
| *G06Q 30/00* | (2012.01) |
| *G06T 11/00* | (2006.01) |

(52) U.S. Cl.
CPC ............ *G06T 11/60* (2013.01); *G06K 9/4671* (2013.01); *G06K 9/6256* (2013.01); *G06N 20/00* (2019.01); *G06Q 30/0185* (2013.01); *G06Q 30/0201* (2013.01); *G06Q 30/0276* (2013.01); *G06T 11/001* (2013.01)

(58) Field of Classification Search
CPC ... G06T 11/60; G06T 11/001; G06Q 30/0185; G06Q 30/0201; G06Q 30/0276; G06K 9/6256; G06K 9/4671; G06N 20/00
See application file for complete search history.

(56) References Cited

U.S. PATENT DOCUMENTS

| | | | | |
|---|---|---|---|---|
| 8,555,157 B1* | 10/2013 | Fu | ........................ | G06F 16/972 |
| | | | | 715/234 |
| 9,747,390 B2* | 8/2017 | Cooper | ................. | G06F 40/242 |
| 10,296,557 B2* | 5/2019 | Dettinger | ............... | G06Q 10/10 |
| 2009/0160856 A1* | 6/2009 | Hoguet | ................... | G06T 17/00 |
| | | | | 345/420 |
| 2011/0072376 A1* | 3/2011 | Moore | .................... | G06F 3/048 |
| | | | | 715/765 |
| 2012/0079400 A1* | 3/2012 | Nauerz | ................. | G06F 3/0481 |
| | | | | 715/762 |

(Continued)

*Primary Examiner* — Aaron W Carter
(74) *Attorney, Agent, or Firm* — Mannava & Kang, P.C.

(57) ABSTRACT

A system for visual and digital content optimization may identify a plurality of content creation attributes from multiple data sources and may classify a content record associated with a content creation requirement into a plurality of exhibits. The system may identify a plurality of rules from a rule record and map the plurality of exhibits with the plurality of rules and the plurality of content creation attributes to create a plurality of content models. Each of the plurality of content models may be evaluated for congruence with the plurality of rules and the content creation attributes. Based on the evaluation, an evaluation score for each of the plurality of content models may be determined. A content model having an evaluation score above a threshold evaluation score may be selected and a content creation action may be initiated accordingly.

20 Claims, 21 Drawing Sheets

(56) References Cited

U.S. PATENT DOCUMENTS

| | | | |
|---|---|---|---|
| 2013/0124507 A1* | 5/2013 | Gartland | G06F 16/9535 |
| | | | 707/723 |
| 2013/0185630 A1* | 7/2013 | Ahmadullin | G06Q 50/00 |
| | | | 715/243 |
| 2015/0039985 A1* | 2/2015 | Hara | G06F 40/174 |
| | | | 715/212 |
| 2017/0024363 A1* | 1/2017 | Tocchini | G06N 7/005 |
| 2017/0024403 A1* | 1/2017 | Tocchini | G06F 40/186 |
| 2017/0024404 A1* | 1/2017 | Tocchini | G06F 40/186 |
| 2018/0293323 A1* | 10/2018 | Abrahami | G06F 15/76 |
| 2018/0373799 A1* | 12/2018 | Koren | G06F 3/0484 |
| 2019/0026280 A1* | 1/2019 | Aviyam | G06N 20/00 |
| 2020/0097536 A1* | 3/2020 | Bedi | G06F 40/186 |
| 2020/0242195 A1* | 7/2020 | Souche | G06F 40/103 |

* cited by examiner

| Case | Example | Visual attention | Visual Weight | Readability | Read. Weight | Accessibility | Access. Weight | Safety | Safety Weight | Aesthetic | Aesthetic Weight | Result | Selection |
|---|---|---|---|---|---|---|---|---|---|---|---|---|---|
| 1 | Image 1404 | 75 | 1 | 50 | 2 | 25 | 1 | 100 | 1 | N/A | 1 | 300 | Yes |
|   | Image 1408 | 75 | 1 | 25 | 2 | 50 | 1 | 100 | 1 | N/A | 1 | 275 | No |
| 2 | Image 1404 | 75 | 1 | 50 | 1 | 25 | 2 | 100 | 1 | N/A | 1 | 275 | No |
|   | Image 1408 | 75 | 1 | 25 | 1 | 50 | 2 | 100 | 1 | N/A | 1 | 300 | Yes |

VISUAL AND DIGITAL CONTENT OPTIMIZATION

PRIORITY

This application claims priority to European Patent Application Number 20305701.3 filed on Jun. 25, 2020, the contents of which are incorporated by reference in their entirety herein.

BACKGROUND

Modern advertisement and marketing strategies rely on an aesthetically-pleasing layout of media that may typically include a mixture of textual, graphical, and other multimedia content. Visually attractive graphical user interfaces (GUIs) tend to reach more clients, increase client engagement, and generate more client interaction. Thus, an important step in developing and creating any GUI-based application is prototyping design mock-ups to eventually experiment, select, and prepare a proof of concept for actual usage and deployment, all in an efficient and effective process.

Visual saliency may be used to test and improve designs. However, traditional solutions for visual saliency typically rely on manual analysis and human design approval. In other words, a conventional approach would require a team of designers to iteratively adapt their designs, submitting it again and again, until the desired result is obtained. A technical problem exists in the fact that a design team must commit significant amounts of developmental resources just to create wireframes or design mock-ups and to judge design ideas before any of these ideas are determined to be good enough to be faithfully translated into code. Furthermore, this process often involves multiple iterations, all of which may be extremely inefficient and requires the participation of many different human design teams. Specifically, a technical problem exists in creating mockups that may augment brand identity and adhere to a layout alignment framework preferred by a skilled designer.

Although some advances have been made with regard to automation of visual saliency, even modern automated GUI editors, which attempt to provide some automation to the prototyping process, have several shortcomings. For instance, existing solutions either lack a visual saliency prediction or require expensive and time-consuming model training for each aspect of a design mockup, hence giving rise to an abstraction gap between presently available solutions and effective automation of visual and digital content creation. This abstraction gap is generally bridged by a developer's domain knowledge, which may be challenging and complex to be automated digitally. Creating an advertisement and marketing content model capable of representing domain knowledge typically held by a skilled designer, and applying this knowledge to create accurate prototypes that may be augmenting brand identity and conforming to alignment rules preferred by the skilled designer is time-consuming and prone to error.

Accordingly, a technical problem with the currently available systems for the creation of advertisement and marketing content is that they may not be able to optimally address specific requirements while catering to brand identity augmentation for an organization. There is a need for a system that may account for the various factors mentioned above, amongst others, to create a model for optimizing visual and digital content creation and at the same time ensure compliance with specific branding requirements of an organization. Additionally, there is a need for an approach that may cater to requirements mentioned above and simultaneously reduce the amount of computational time and resources that may currently be required for creating various models for achieving similar results.

BRIEF DESCRIPTION OF DRAWINGS

FIGS. 14A and 14B illustrate a design evaluation and scoring process for visual and digital content optimization, according to an example embodiment of the present disclosure.

DETAILED DESCRIPTION

Figure 1:
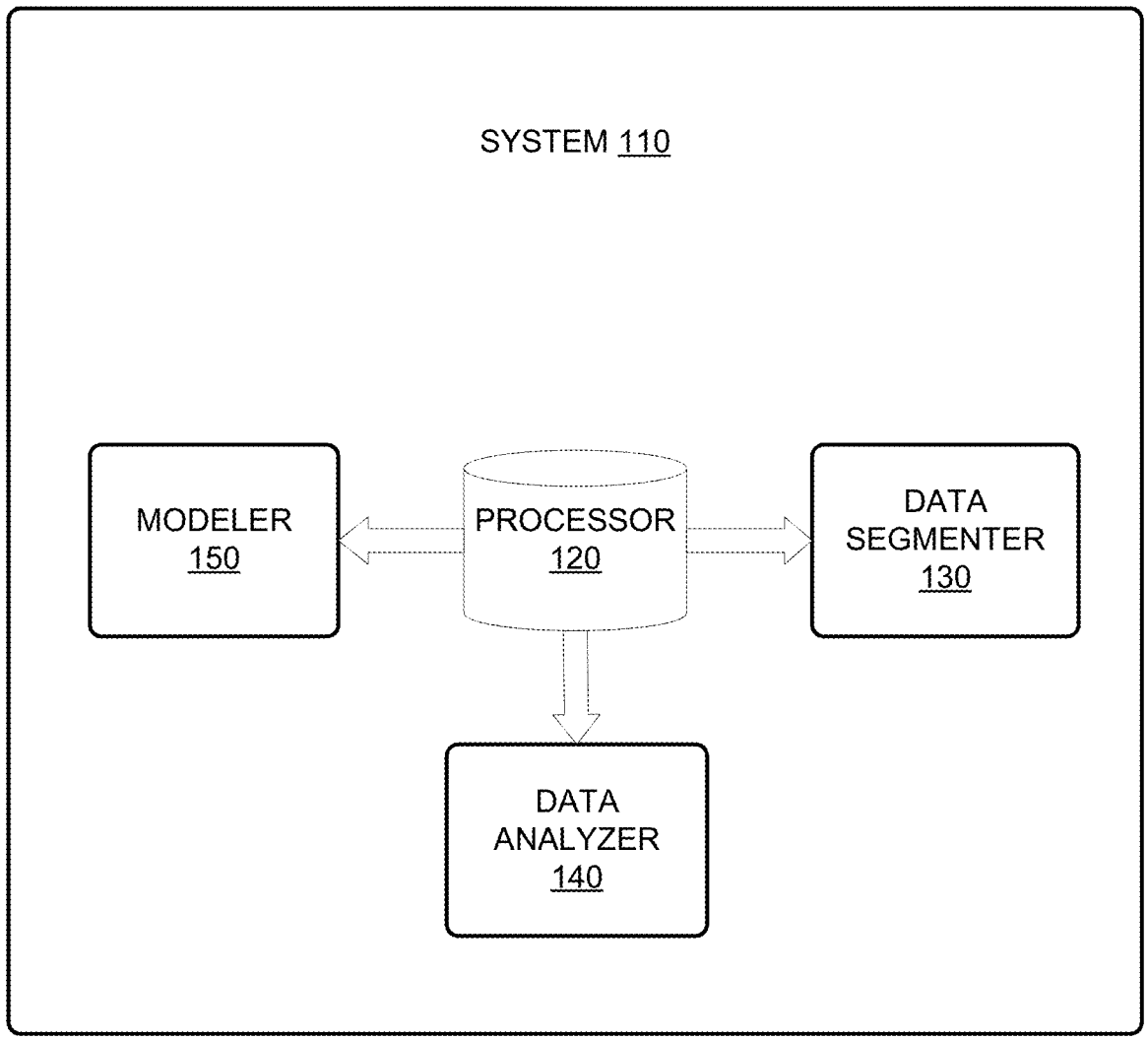
FIG. 1 illustrates a visual and digital content optimization system, according to an example embodiment of the present disclosure.

For simplicity and illustrative purposes, the present disclosure is described by referring mainly to examples thereof. The examples of the present disclosure described herein may be used together in different combinations. In the following description, details are set forth in order to provide an understanding of the present disclosure. It will be readily apparent, however, that the present disclosure may be practiced without limitation to all these details. Also, throughout the present disclosure, the terms "a" and "an" are intended to denote at least one of a particular element. The terms "a" and "an" may also denote more than one of a particular element. As used herein, the term "includes" means includes but not limited to, the term "including" means including but not limited to. The term "based on" means based at least in part on, the term "based upon" means based at least in part upon, and the term "such as" means such as but not limited to. The term "relevant" means closely connected or appropriate to what is being done or considered.

The present disclosure describes systems and methods for advertisement and marketing content creation using Artificial Intelligence (AI) based visual saliency analysis for visual and digital content optimization. A visual and digital content optimization system (VDCOS) hereinafter referred to as "system" may be used for an automated assessment of various design influencing factors, such as visual saliency features, media content creation rules, domain knowledge from a skilled expert, brand identity augmenting features, digital text curation requirements and the like. The assessment of the design influencing factors may facilitate the creation of design mocks ups for experimenting and selecting advertising design concepts that may effectively and efficiently augment brand identity to attract a wider client base.

The system may include a processor coupled to a data segmenter, a data analyzer, and a modeler. The data segmenter may receive a content creation requirement from a user and may obtain a content record from a plurality of sources pertaining to the processing of the content creation requirement. Further, the data segmenter may implement a first AI component to identify one or more content creation attributes from the plurality of sources preponderant to processing the content creation requirement. The content record may be classified into a plurality of exhibits, where each of the exhibits may comprise a display trait from the content record. An exhibit annotation may also be associated with each of the exhibits.

The data analyzer may implement a second AI component to identify a plurality of rules from a rule record obtained from the plurality of sources, where each of the rules may be associated with processing the content creation requirement. The modeler may map the exhibit annotation associated with each of the exhibits with the rules and the content creation attributes to create a plurality of content models, where each of the content models may comprise a model layout associated with processing the content creation requirement. The content models may be evaluated for congruence with the rules and the content creation attributes. Based on the evaluation, an evaluation score may be determined for each of the content models by the modeler. The modeler may select a content model from amongst all the content models having respective evaluation scores above a threshold evaluation score. Further, a content creation action may be initiated by the modeler based on the selected content model to address the content creation requirement.

Accordingly, the present disclosure provides efficient visual and digital content optimization that may account for the various factors mentioned above, amongst others. The present disclosure provides a robust approach for automatically creating a marketing content model capable of representing domain knowledge. Additionally, the marketing content model may be created for augmenting brand identity and conforming to content alignment rules preferred by a skilled designer. Furthermore, the marketing content model may categorically analyze various aspects of visual and digital content optimization for generating visual saliency predictions that may effectively and efficiently attract a wider client base.

FIG. 1 illustrates a system 110 for visual and digital content optimization, according to an example implementation of the present disclosure. In an example, the system 110 may include a processor 120. The processor 120 may be coupled to a data segmenter 130, a data analyzer 140, and a modeler 150.

The data segmenter 130 may receive a content creation requirement from a user. The content creation requirement may be related to the generation of a model for automatically creating and evaluating advertising and media content with minimal manual intervention. Additionally, the content creation requirement may be related to generating a visual saliency prediction for a set of visual and digital content to be used for advertising operations of an enterprise implementing the system 110. Further, the content creation requirement may be related to an automated assessment of various factors such as visual saliency features, media content creation rules, domain knowledge from a skilled expert, brand identity augmenting features, digital text curation requirements and the like for facilitating the creation of design mocks ups for experimenting, and selecting advertising design concepts that may effectively and efficiently adhere to brand identity regulations and attract a wider client base.

The data segmenter 130 may obtain a content record from a plurality of sources pertaining to the processing of the content creation requirement. The content record may be an input sent by a user to the system 110 for processing the content creation requirement. The content record may include a document comprising a brand guideline set forth by an enterprise. The brand guideline may facilitate to deliver a consistent brand message and experience to make the brand identity stronger. Additionally, the brand guideline may specify a set of regulations to apply to any communication and visuals sent forward by an enterprise such as a tone of voice in digital text, a font size, and the like. Additionally, the content record may include design elements for visual and digital content creation corresponding to a brand guideline.

The plurality of sources (also referred to as data sources hereinafter) may be various raw inputs that may be accessed by the system 110 for obtaining information about an enterprise. The data sources may include various data sources such as a video, a website uniform resource locator (URL), an image, a text document, a magazine, a marketing flyer, a list of discrete elements related to an organization, data from social media, and the like. In an example embodiment, the data from social media may include data corresponding to any type of Internet-based application for creating and exchanging user-generated content, which may include information collected from social networking portals, microblogging portals, photo sharing platforms, news aggregation portals, video sharing platforms, live casting platforms, virtual worlds, social gaming platforms, social search, instant messaging portals, or other interactive media sources. Furthermore, the data sources may include historical records related to content associated with the content creation requirement that may have been created for an enterprise.

The data segmenter 130 may implement a first artificial intelligence component to identify a plurality of content creation attributes (also referred to as content creation attributes hereinafter) from the plurality of sources preponderant to processing the content creation requirement from the data sources. The content creation attributes may be a set of measurable design influencing factors that may be identified by the data segmenter 130 for processing the content creation requirement. The content creation attributes may be identified from data sources such as a video, a website uniform resource locator (URL), an image, a text document, and the like. The content creation attributes may include design elements such as a logo of an enterprise, a text format layout preferred by the enterprise, an image layout preferred by the enterprise, and the like. Thus, the content creation attributes may include various aesthetic elements and/or design elements of visual and digital content, such as a logo, a headline, a product image, and the like.

The first artificial intelligence component may segment the input obtained from the data sources in a list of content creation attributes such as logo, headlines, sub-headlines, price tags, product images, graphic elements, and the like. In an example embodiment, the data segmenter 130 may segment the input into a combination of multiple elements, for example, a video extract and a logo may be identified as two (2) elements to be present together. The first artificial intelligence component may include implementation of various artificial intelligence (AI) techniques such as natural language processing (NLP), natural language generation (NLG), image to text conversion, Web scraping, document object model (DOM) parsing, computer vision, optical character recognition and the like, to simulate human browsing to enable data gathering and processing. In an example, the AI techniques may provide for fetching (e.g., downloading content or data from a web page) and extraction (e.g., parsing, searching, reformatting, copying, compiling, monitoring, etc.) of data.

The data segmenter 130 may implement the first artificial intelligence component to classify the content record into a plurality of exhibits (also referred to as exhibits hereinafter) where each of the plurality of exhibits may comprise a display trait from the content record. The exhibits may be a set of regulations for visual and digital content creation corresponding to the brand guideline. The exhibits may specify which logo to use and allowed variations for each type of communication (for example, an email, a social media feed, and the like) and context (for example, internal circulation within an organization, external circulation outside the organization, and the like). Additionally, the exhibits may specify different space alignments between the design elements such as titles, blocs of text, images, logos, links, buttons, calls to action, and the like. Further, the exhibits may specify authorized colors for background, texts, images, and the like. Additionally, the exhibits may specify authorized elements in images, images color balance, rules around sensitive content (for example, alcohol, nudity, sex, violence, and the like). Furthermore, the exhibits may lay out conditions for various fonts that may be used for a different type of communication and context. Additionally, each of the exhibits may include a distinguishing characteristic that may impact a morphology of the digital and visual content created therefrom. In an example embodiment, the display trait may be the distinguishing characteristic.

The data segmenter 130 may implement the first artificial intelligence component to identify an exhibit annotation associated with each of the exhibits. The exhibit annotation may refer to deciphering a machine-recognizable meaning of the display traits for each exhibit. In an example embodiment, the data segmenter 130 may parse each of the plurality of exhibits with a preconfigured annotation library to identify the exhibit annotation associated with each of the plurality of exhibits. The pre-configured annotation library may include a number of distinguishing characteristics stored as a labeled design corpus. In an example, the distinguishing characteristics may be associated with the brand guideline for an organization. The data segmenter 130 may compare the display trait for each of the exhibits identified from the content record with those present in the labeled design corpus for identifying the exhibit annotation.

The data analyzer 140 may implement a second artificial intelligence component to identify a plurality of rules (also referred to as rules hereinafter) from a rule record obtained from the data sources, where each of the rules may be associated with processing the content creation requirement. The rule record may include various aesthetic elements of visual and digital content creation developed by a human design expert. In an example embodiment, the rule record may include various aesthetic elements of visual and digital content creation developed by an automated design creation algorithm. Thus, the rule record may include design inputs provided by a design expert (human or machine-based) for efficient and effective optimization of the visual and digital content. In an example embodiment, the rules may include directions for color selection, color combinations, positioning, and alignment of various design elements for visual and digital content creation. Additionally, the rules may define margins, optimize readability, define which elements may be appropriately used together in conjunction. Furthermore, the rules may leverage the design knowledge of a human expert and translate the same into a cognitive learning operation for visual and digital content optimization. The second artificial intelligence component may include the implementation of various artificial intelligence (AI) techniques such as natural language processing (NLP), natural language generation (NLG), and the like for cognitively deciphering the rules and cognitively enriching the same as per requirements.

The modeler 150 may map the exhibit annotation with the rules and the content creation attributes to create a plurality of content models (also referred to as content models hereinafter), where each of the content models may include a model layout associated with processing the content creation requirement. The content model may be a set of visual and digital content created by aligning various design elements. The model layout may refer to an arrangement in which various design elements may be arranged. In an example embodiment, each of the model layouts may be a design of the visual and digital content of an organization created by the system 110 for processing the content creation requirement.

The modeler 150 may assemble various design elements such as logo, headlines, sub-headlines, digital content and the like to form various content models. Further, each content model may be morphologically unique in terms of the model layout of design elements comprised therein. The modeler 150 may create each of the content models by aligning the design elements in different combinations. In an example embodiment, the modeler 150 may select the different combinations based on various values of the exhibit annotation. For example, a content model may be created with a particular font style "X", a particular color combination "Y" and a particular text alignment "Z". The modeler 150 may create various other content models wherein the text alignment "Z" may be retained and the font style "X", and the color combination "Y" may vary. For example, a font style "A" and a color combination "B" may be used along with the text alignment "Z". Similarly, the modeler 150 may create various content models by varying various design elements. The modeler 150 may gather design elements of an initial design obtained from a data source such as historical records and adjust various positional elements, dimensions, colors, effects, and the like to generate variations of a design or layout. The variations of a layout may lead to the creating of the plurality of content models. In an example embodiment, the content model may be in the form of a document, a video, an image, and the like.

The modeler 150 may evaluate each of the content models for congruence with the plurality of rules and the content creation attributes. The modeler 150 may discard the content models that may not conform to either the rules or the content creation attributes. Based on the evaluation, the modeler 150 may determine an evaluation score for each of the content models. The evaluation score may indicate a degree of aesthetic appeal of the content model. In an example embodiment, the content model with the highest evaluation score may be selected by the modeler 150 for processing the content creation requirement. The content models may be evaluated over various evaluation parameters using various AI-based techniques. The evaluation and scoring of the content models have been described further with respect to description for subsequent figures.

The modeler 150 may select a content model from amongst the plurality of content models having respective evaluation score above a threshold evaluation score. In an example, the modeler 150 may select multiple content models from amongst the plurality of content models having respective evaluation scores above a threshold evaluation score. The threshold evaluation score may be pre-defined by a user or may be dynamically configurable. In an example embodiment, the evaluation score for all the content models may be displayed to a user for obtaining user input for selecting the content model based on the evaluation score. The modeler 150 may determine the threshold evaluation score based on evaluating the aesthetic value of each of the content models. The evaluation may include an analysis of the content model over an evaluation parameter.

In an example embodiment, the modeler 150 may analyze various visual saliency features of each of the content models. Further, the modeler 150 may determine an aesthetic value of each of the content models based on the analysis of the visual saliency features of each of the content models. The aesthetic value may be indicative of a visual appeal of a content model. The modeler 150 may submit all the content models for visual saliency analysis. The visual saliency analysis may determine the most appealing content model from all the content models submitted. In an example embodiment, the modeler 150 may determine the aesthetic value for each of the content models based on the visual saliency analysis. In an example embodiment, the content model with the highest aesthetic value may be selected by the modeler 150 for processing the content creation requirement. In an example embodiment, the content model with the aesthetic value higher than a threshold aesthetic value may be selected by the modeler 150 for processing the content creation requirement. The threshold aesthetic value may be predefined by a user or may be dynamically configurable. In an example embodiment, the aesthetic value for all the content models may be displayed to a user for obtaining user input for selecting the content model based on the aesthetic value for processing the content creation requirement.

The modeler 150 may analyze the visual saliency features based on a neural network trained with visual saliency data and other AI-based techniques to determine the aesthetic value. These techniques may include a convolutional neural network (CNN) for visual saliency prediction trained with generative adversarial networks. In an example embodiment, the machine learning or AI-based techniques may involve clustering, classification, pattern mining, logistic regression, decision tree, random forest, semantics, knowledge graph analysis, and/or other techniques.

In an example embodiment, the modeler 150 may ascertain whether a rule or a content creation attribute has been updated. The modeler 150 may modify the threshold evaluation score based on at least one of an updated content creation attribute and an updated rule. Further, the modeler 150 may determine for each of the content models, the presence of a readability support indicator as a factor in determining the evaluation score. The readability support indicator may include one of an accessibility indicator for color-blind users, a color contrast indicator, and a readability indicator (explained in detail with respect to description of subsequent figures).

The modeler 150 may initiate a content creation action based on the selected content model to address the content creation requirement. In an example embodiment, the content creation action may include the generation of the optimized visual and digital content for an organization. In an example embodiment, the modeler 150 may initiate the content creation action automatically for visual and digital content optimization. In another example embodiment, the modeler 150 may be configurable to obtain input from a user for visual and digital content optimization as well as configurable to generate the same based on the selected content model automatically.

The system 110 may be fully automated from receiving the content creation requirement to initiation of the content creation action or it may be semi-automatic, taking in select inputs from a user to help determine the most appealing design or layout. It should also be appreciated that the system 110 may perform content model generation and content model evaluation in parallel, which may also save time and improve efficiency. The count of designs created and tested in the system 110 may far exceed what a human designer team could create and test in the same amount of time. The system 110 may create effective content models that may be conforming to both the brand guidelines and the design inputs thereby enhancing identify of an associated brand and reducing the amount of time and resources that may otherwise be required to creating and testing various models for achieving similar results. The visual and digital content created by the system 110 may be visually more efficient for branding and advertising. Also, since fewer combinations may be tested due to stringent requirement of adherence to the brand guidelines and the rules, the content generation may be faster, and thus more creative features such as changing colors and/or applying visual effects on elements may be tested to get over performing results.

For the sake of brevity and technical clarity, the description of the system 110 may be restricted to a few exemplary embodiments; however, to a person skilled in the art, it should be clear that the system 110 may be used for the fulfillment of various advertisement and marketing content creation requirements and visual saliency predictions other than those mentioned hereinafter.

Figure 2:
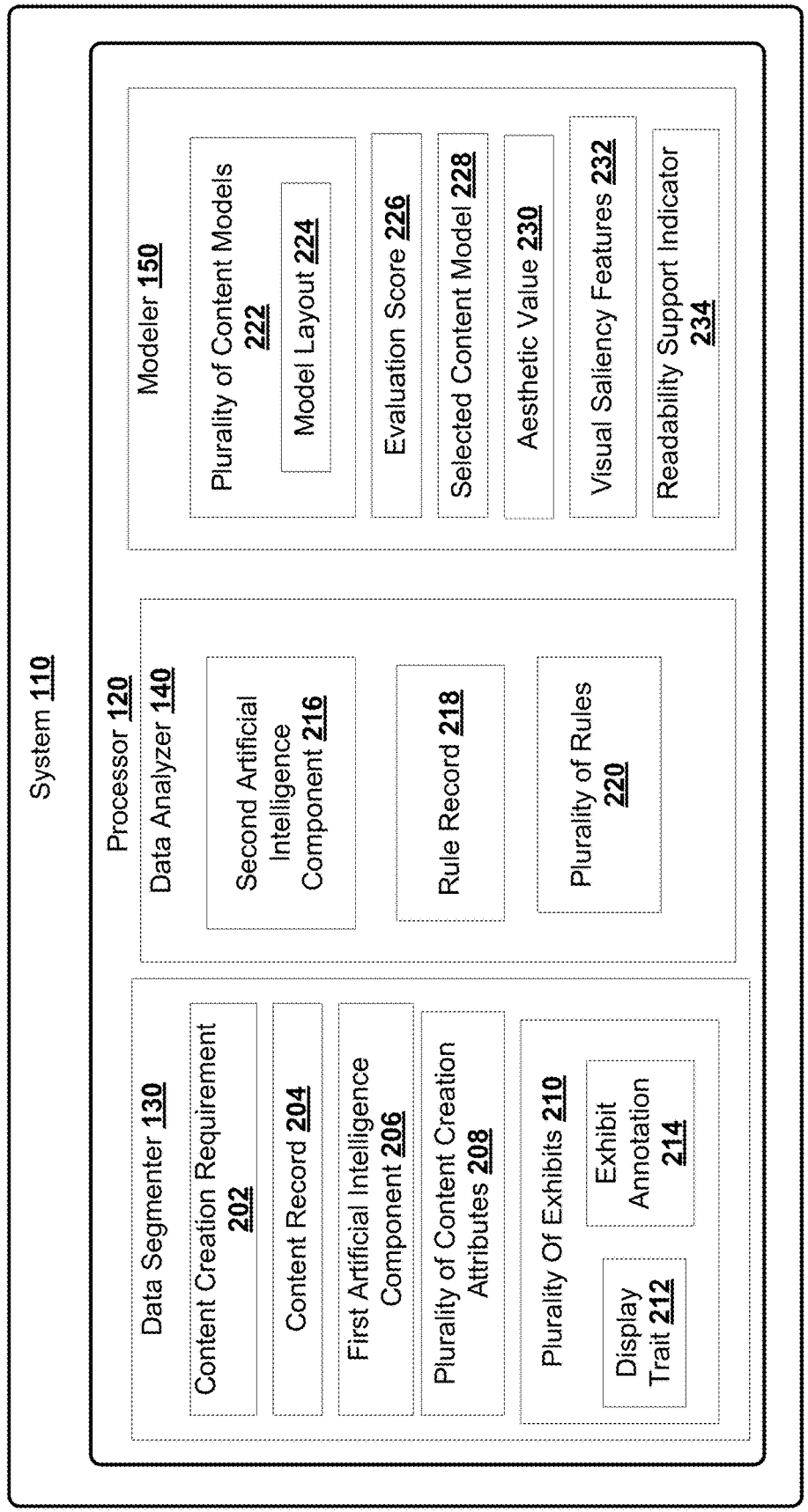
FIG. 2 illustrates various components of the visual and digital content optimization system, according to an example embodiment of the present disclosure.

FIG. 2 illustrates various components of a visual and digital content optimization system 200, according to an example embodiment of the present disclosure. The system 200 may be an exemplary embodiment of the system 110 described with respect to description of FIG. 1. Any of the components of the system 110 may be deployed by the system 200 and may be referred to for describing the system 200. In an example embodiment, the system 200 may include the processor 120. The processor 120 may be coupled to the data segmenter 130, the data analyzer 140, and the modeler 150.

The data segmenter 130 may receive a content creation requirement 202 from a user. The content creation requirement 202 may be related to identifying the position of a product in a design model such as a video. The content creation requirement 202 may be related to identifying the best layout for a website, a product page, an advertisement, a billboard display, a document, and the like for augmenting the brand identity of an organization and also ensuring compliance with design and content regulations of an organization. The content creation requirement 202 may be related to designing a comprehensive advertising and marketing package that has been tested for visual saliency for promoting a particular product or a service. The content creation requirement 202 may be related to identifying colors and shapes for various design elements based on visual saliency predictions and at the same time adhering to a brand guideline and a set of design rules for content creation, thereby increasing the effectiveness of the visual and digital content created therefrom.

The data segmenter 130 may obtain a content record 204 pertaining to the processing of the content creation requirement 202 from various data sources such as a video, a website uniform resource locator (URL), an image, a text document, a magazine, a marketing flyer, a list of discrete elements related to an organization, data from social media, and the like. The content record 204 may be an input sent by a user to the system 110 for processing the content creation requirement 202. The data segmenter 130 may implement a first artificial intelligence component 206 to identify a plurality of content creation attributes 208 preponderant to processing the content creation requirement 202 from the data sources. In an example embodiment, the content creation attributes 208 may be identified from a data source such as a video with an image integrated therein. The first artificial intelligence component 206 may extract single design elements such as a logo, an image, a video, a headline, a sub-headline, and the like from the data sources to identify the content creation attributes 208. The content creation attributes 208 may include the selection of a format such as Facebook Format®, a Google Display Format® for which the visual and digital content may be optimized. The content creation attributes 208 may stipulate which design elements may be preferred by an organization for a specific type of content creation. For example, an organization may prefer various design elements such as a logo, a headline, a product image, a video and the like to be present in a content set created fora particular organization operation such as advertising fora product. In accordance with various embodiments of the present disclosure, the content creation attributes 208 may be a set of priority parameters that may be given precedence for creating media content for processing the content creation requirement 202.

In an example embodiment, the first artificial intelligence component 206 may include the implementation of a tone analyzer algorithm to detect a tone of voice from the data sources. In an example embodiment, the first artificial intelligence component 206 may include the implementation of an emotion detection algorithm to detect various non-verbal cues and emotions present in input feed from the data sources.

The data segmenter 130 may implement the first artificial intelligence component 206 to classify the content record 204 into a plurality of exhibits 210 where each of the exhibits 210 may comprise a display trait 212 from the content record 204. For example, if the content record 204 may be fed to the data segmenter 130 with an already existing web page or a picture, the first artificial intelligence component 206 may segment the layout into smaller individual design elements that may be classified as the exhibits 210. The first artificial intelligence component 206 may implement a guideline extractor for extracting information from the content record 204 and classifying the same into the exhibits 210. The guideline extractor may include a text parsing algorithm for ingesting information present in the content record 204 for identifying the exhibits 210. In an example embodiment, the content record 204 may include a text document fed to the system 110 by a user. The text parsing algorithm may parse the text document to extract guidelines such as a set of fonts to use, a set of logos to use in various situations, a set of colors representing a brand, a space alignment with respect to various design elements. An exemplary space alignment may be illustrated in FIG. 11.

Additionally, each of the exhibits may include a distinguishing characteristic that may impact a morphology of the digital and visual content created therefrom such as a font color, a font size, an image design, and the like. In an example embodiment, the display trait may be the distinguishing characteristic. In an example embodiment, the first artificial intelligence component 206 may extract single design elements such as the font color, the font size, the image design, and the like from the content record 204 to identity the exhibits 210. In an example embodiment, the first artificial intelligence component 206 may include the implementation of a tone analyzer algorithm to a tone of voice from the content record 204 such as the text document. The data segmenter 130 may implement the first artificial intelligence component 206 to identify an exhibit annotation 214 associated with each of the exhibits 210. The exhibit annotation 214 may refer to deciphering a machine recognizable meaning of the display traits 212 for each exhibit. The design information extracted and classified as the exhibits 210 may be deciphered, stored, and accessed by the system 110 as the exhibit annotation 214. Additionally, the exhibits 210 may stipulate various constraints on single design elements stipulated by the content creation attributes 208. For example, the content creation attributes 208 may identify a logo as a design element preponderant to processing the content creation requirement 202. The exhibits 210 may specify which logo to use and allowed variations for each type of communication. Similarly, the content creation attributes 208 may stipulate an image as being preponderant to processing the content creation requirement 202. The exhibits 210 may specify types of images and image background colors, and the like that may facilitate augmentation of identification of an associated brand or product.

The data analyzer 140 may implement a second artificial intelligence component 216 to identify a plurality of rules 220 from a rule record 218 obtained from the data sources, where each of the rules 220 may be associated with processing the content creation requirement 202. The rule record 218 may include various aesthetic elements of visual and digital content creation developed by a design expert. The second artificial intelligence component 216 may implement various text parsing, and tone detection techniques to decipher the rule record 218 for identifying the rules 220. The rules 220 may be preferred design elements such as an alignment between elements, a space alignment between elements, restriction on a minimum and maximal font size, constraints pertaining to composition of element combinations, color combinations, and the like. The content creation attributes 208 may stipulate which design elements may be preferred by an organization for a specific type of content creation. For example, an organization may prefer various design elements such as a logo, a headline, a product image, a video, and the like. The rules 220 may stipulate conditions on the design elements as imposed by a design expert.

The content creation attributes 208 may include single design elements that may be required for processing the content creation requirement 202. The exhibits 210 may include inputs from the brand guidelines (fed as the content record 204) and the rules 220 may include inputs from a design expert (fed as the rule record 218) for addressing the content creation requirement 202. In an example embodiment, the exhibits 210 may set acceptable limits for the content creation attributes 208 and the rules 220 may enrich the exhibits 210. For example, content creation attributes 208 may specify that a logo must be used for processing the content creation requirement 202, the exhibits 210 may be specified which logo to use and allowed variations for each type of communication (for example, an email, a social media feed, and the like) and context (for example, internal circulation or external circulation). The rules 220 may, for example, provide a set of appropriate color combinations for each of the logo variations present in the exhibits 210. It should be appreciated by the one skilled in the art that many such combinations of comparison between the content creation attributes 208, the exhibits 210, and the rules 220 may be possible without diverting from the scope of the disclosure.

The modeler 150 may map the exhibit annotation 214 with the rules 220 and the content creation attributes 208 to create a plurality of content models 222, (also referred to as the content model 222 or the content models 222 for sake of technical clarity) where each of the content models 222 may include a model layout 224 (also referred to as the model layouts 224 for sake of technical clarity) associated with processing the content creation requirement 202. The content model 222 may be a set of visual and digital content created by aligning various design elements. The model layout 224 may refer to an arrangement in which various design elements may be arranged. In an example embodiment, each of the model layouts 224 may be a design of the visual and digital content of an organization created by the system 110 for processing the content creation requirement 202. The modeler 150 may generate unique model layouts 224 based on mapping the exhibit annotation 214 with the rules 220 and the content creation attributes 208. For example, the modeler may create multiple content models 222 by changing a position, a font size, a text font style, various effects for a design element (any of the content creation attributes 208) such as a logo to a degree as allowed by the rules 220 and the exhibits 210.

The modeler 150 may create the model layouts 224 for the content models 222 by assembling discrete single elements as specified by the content creation attributes 208 and vary various features of the design elements such as color, size, effects, alignment, positions, space alignment and the like as allowed by the exhibits 210, and the rules 220. The modeler 150 may evaluate each of the content models 222 for congruence with the plurality of rules 220 and the content creation attributes 208. For example, after the design elements with a specific size and position have been placed to create a variation such as the content model 222, the modeler 150 may check that the design elements should conform to the rules 220 and the exhibits 210. In an example embodiment, conforming to the rules 220 and the exhibits 210 may include checks such as alignment between elements, desirable margins, and the like. In an example embodiment, conforming to the rules 220 and the exhibits 210 may also include complex evaluation operations such as analysis of a hierarchy between elements and a visual composition of a particular content model 222. The modeler 150 may evaluate the content model 222 only when it may conform to the rules 220 and the exhibits 210. In cases where the content model 222 may not conform to the rules 220 and the exhibits 210, the modeler 150 may discard such content models 222 without evaluation, thereby reducing the amount of time and resources required to evaluate all the content models 222. Therefore, the system 110 may produce a design compliant with the brand guidelines and design inputs in a much more effective and efficient manner.

The modeler 150 may evaluate the content models 222 by providing a score to each content model 222 based on content creation attributes 208. As mentioned above, the content creation attributes 208 may be the priority parameters that may be given precedence for creating the media content. The modeler 150 may adapt the scoring of the content model 222 based on the content creation attributes 208. The evaluation may provide visual performance information on the entire model layout 224 and also on each of the individual design elements comprised therein. Based on the evaluation, the modeler 150 may determine an evaluation score 226 for each of the content models 222. The evaluation score 226 may indicate a degree of aesthetic appeal of the content model 222.

The evaluation may include a visual saliency analysis for the content model 222. In an example embodiment, the modeler 150 may analyze visual saliency features 232 of each of the content models 222. Further, the modeler 150 may determine an aesthetic value 230 of each of the content models 222 based on the analysis of the visual saliency features 232 of each of the content models 222. The aesthetic value 230 may be indicative of a visual appeal of a content model 222. The aesthetic value 230 may be determined based on analysis of the past performance of visual content, based on Key Performance Indicators (KPIs) such as engagement on social media, the performance of advertisements like Click Through Rate (CTR), and the like. A machine learning algorithm trained on historical data may be deployed to predict aesthetic value 230 for the content model 222.

The modeler 150 may analyze the visual saliency features 232 based on a neural network trained with visual saliency data and other AI-based techniques to determine the aesthetic value 230. These techniques may include a convolutional neural network (CNN) for visual saliency prediction trained with generative adversarial networks. In accordance with various embodiments of the present disclosure, the machine learning or AI-based techniques may involve clustering, classification, pattern mining, logistic regression, decision tree, random forest, semantics, knowledge graph analysis, and/or other techniques. The CNN for the visual saliency prediction may determine a saliency score for each pixel comprised within the content model 222. The modeler 150 may determine a visual saliency score for each of the content model 222 from the saliency score for each pixel comprised therein. In an example embodiment, the visual saliency score may be determined by a mean determination method using the following equations:

$$\text{Mean asset score} = \frac{\frac{\sum \text{assetpixelscore}}{\text{number of asset pixels}}}{\frac{\sum \text{imagepixelscore}}{\text{number of image pixels}}} \quad \text{Equation (1)}$$

$$\text{Final score} = \sum \frac{\text{Mean asset score}_i}{\text{priority}_i} \quad \text{Equation (2)}$$

where:
Asset=the content model 222
Mean asset score=an average score using the mean determination
assetpixelscore=the score of each pixel of the asset;
numberofassetpixels=the asset size or the number of pixels;
imagepixelscore=the score of each picture of the asset;
Final score=the image score; and
priority$_i$=the priority of the asset based on the content creation attributes 208;

Further, to avoid a size bias towards small objects, which exhibit a higher mean asset score, the CNN model may incorporate the size of the asset as a determinant for the final score. In an example embodiment, an unbiased mean calculation method calculation may include the following equations:

Equation (3)

$$\text{Unbiasedmeanassetscore} = \text{mean asset score} \sqrt{\text{numberofassetpixels}} \text{; and}$$

$$\text{Final score} = \sum \frac{\text{Unbiasedmeanassetscore}_i}{\text{priority}_i}$$

where:
unbiasedmeanassetscore=an asset score using the unbiased mean method;
mean asset score=the asset score using the mean; and
numberofassetpixels=the asset size or the number of pixels.

Additionally, the modeler 150 may deploy various evaluation parameters for conducting the evaluation of the content model 222 and determining the evaluation score 226 for the content model 222. For example, the presence of a readability support indicator 234 may be determined for the content model 222 as a factor to use in determining the evaluation score 226. The readability support indicator 234 may include one of an accessibility indicator for color-blind users, a color contrast indicator, and a readability indicator. The readability support indicator 234 may be determined by implementing various computer vision-based cognitive techniques to ensure the created model layout 224 may be visible by the highest number of people and that it may be published. The accessibility indicator for color-blind users may analyze the model layout 224 for what would people with color blindness see such as tritanopia, deuteranopia, and protanopia. Tritanopia is a condition where a person may not be able to distinguish between blue and yellow colors. Deuteranopia is a condition where a person may not be able to distinguish between red and green colors. Protanopia is a condition where a person may not be able to distinguish between red, green, and yellow colors. (exemplary accessibility indication analysis for color blindness is described with respect to description for FIGS. 15A and 15B).

The color contrast indicator and the readability indicator may include the implementation of various Optical Character Recognition (OCR) techniques on the content model 222 to check the result with an initial input to ensure the texts comprised within the content models 222 may be readable. Additionally, the modeler 150 may use several other evaluation parameters such as safety checks including verification of potential nudity, violence, drug, spoofed, or racy content in the content model 222 (exemplary safety analysis is described with respect to description for FIGS. 15A and 15B). The modeler 150 may deploy various AI-based tools and techniques for conducting safety checks.

All the aforementioned factors may be used for the determination of the evaluation score 226. The evaluation score 226 may follow the equation:

Score=(Visual Score*$\rho$VS)+(Accessibility*$\rho A$)+
(Readability*$\rho R$)+(Safety*$\rho S$)+
(Aesthetic*$\rho$AE),    Equation (4)

where (Visual Score*$\rho$VS)=the visual saliency score for the content model 222 under evaluation;

$\rho$VS=a Spearman's rank correlation coefficient for the visual saliency (Accessibility*$\rho A$)=a value for accessibility indicator for color-blind users;

$\rho A$=a Spearman's rank correlation coefficient for the accessibility indicator;

(Readability*$\rho R$)=a value for color contrast indicator and the readability indicator;

$\rho R$=a Spearman's rank correlation coefficient for the color contrast indicator and the readability indicator;

(Safety*$\rho S$)=a value for safety checks such as verification of potential nudity, violence, drug, spoofed or racy content;

$\rho S$=a Spearman's rank correlation coefficient for the safety checks;

(Aesthetic*$\rho$AE)=the aesthetic value 230 for the content model 222 under evaluation; and $\rho$AE=a Spearman's rank correlation coefficient for the aesthetic value 230.

In an example embodiment, the evaluation may be done using various other criteria or parameters and respective correlation coefficients other than those mentioned above with respect to Equation (3) and Equation (4) without diverting from the scope of the disclosure. The evaluation score 226 may follow the equation:

Score=$\Sigma$Criteria*weighting    Equation (5)

where,
Criteria=a parameter being used for evaluation; and
weighting=correlation coefficients or weightage of the parameter being used for evaluation.

For the sake of brevity and technical clarity, details regarding the calculation of Spearman's rank correlation coefficient for each of the evaluation parameters are not presented herein, however, it should be clear to one skilled in the art.

The modeler 150 may select a content model 222 from amongst the plurality of content models 222 having the evaluation score 226 above a threshold evaluation score. The modeler 150 may determine the threshold evaluation score based on evaluating the aesthetic value 230 of each of the content models 222 over an evaluation parameter, the evaluation parameter indicative of visual saliency of each of the of content models 222. In an example embodiment, user input may be required for determining the threshold evaluation score. The threshold evaluation score may be a lower limit for the evaluation score 226, which must be attained by the content model 222 before being eligible for the aforementioned selection. In an example embodiment, the threshold evaluation score may be determined by a design expert or may be automatically configurable. The content model 222 having the evaluation score 226 above the threshold evaluation score may be referred to as a selected content model 228 (also referred to as selected content models 228). The selected content models 228 may be presented to a user of the system 110.

The modeler 150 may initiate a content creation action based on the selected content model 228 to address the content creation requirement 202. The content creation action may include selecting one of the content models 222 from amongst various selected content models 228. The content model selected from the selected content models 228 may be a visually and digitally optimized content set created for processing the content creation requirement 202. In an example embodiment, the content creation action may be initiated by a user. In another exemplary embodiment, the system 110 may be configurable to automatically select one of the content models 222 from amongst various selected content models 228. Additionally, results from the content creation action may be presented to a user in an electronic format such as image, a document, and the like. In an example embodiment, a user may manually reject or accept a content model 222 from amongst various selected content models 228.

Accordingly, the system 110 provides visual and digital content optimization based on brand guidelines and design inputs by leveraging various AI techniques for enhanced brand visibility, adherence to human expert parameters, effective promotion of various goods and services, reduction in the amount of time and resources consumed, and reduction in the count of human errors.

Figure 3:
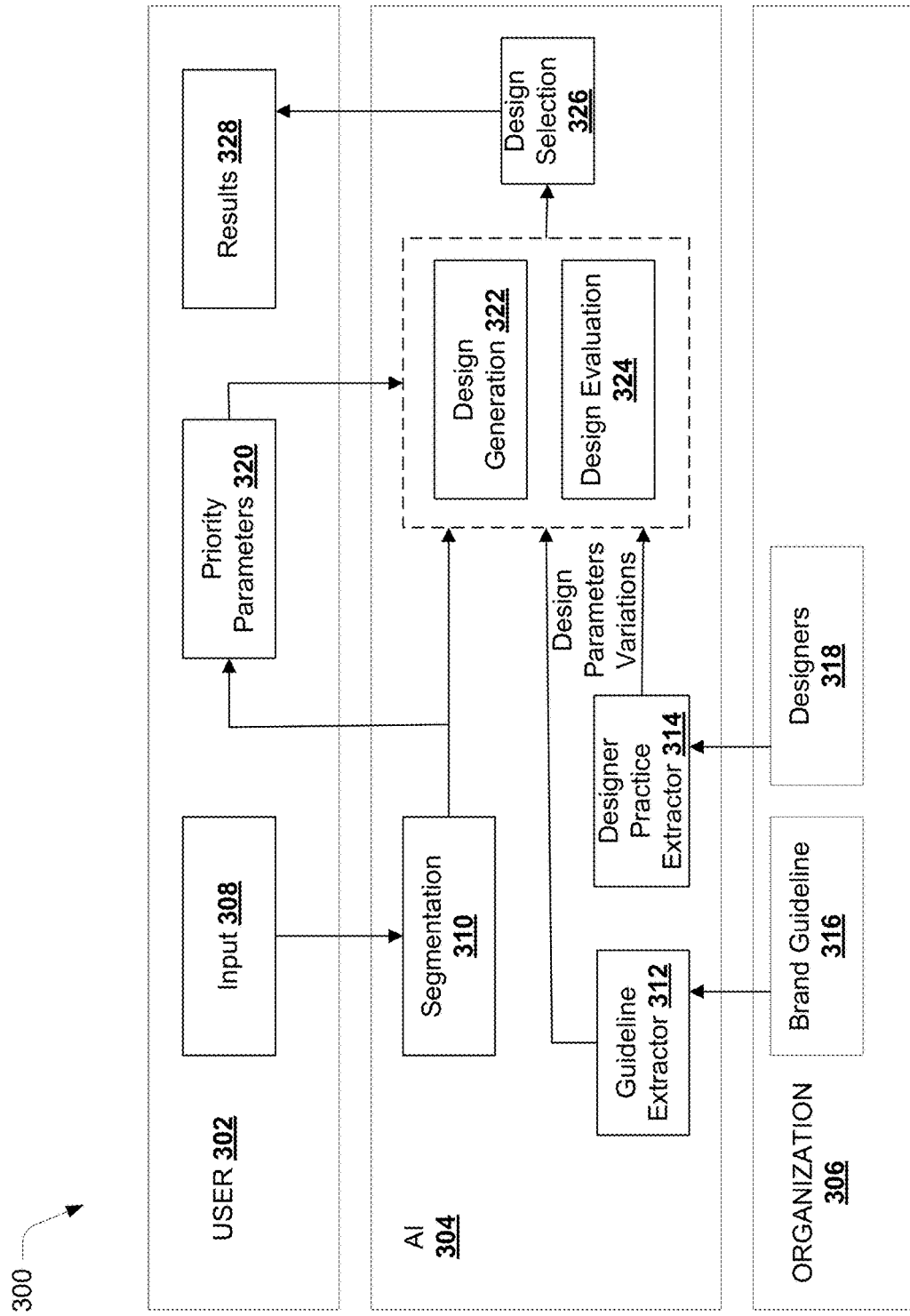
FIG. 3 illustrates a flow diagram for visual and digital content optimization, according to an example embodiment of the present disclosure.

FIG. 3 illustrates a flow diagram 300 for visual and digital content optimization, according to an example embodiment of the present disclosure. The flow diagram 300 illustrates visual and digital content optimization operation of the system 110, according to an example embodiment of the present disclosure. The flow diagram 300 depicts a user component 302, an AI component 304, and an organization component 306. The user component 302 may include an interface for interaction of a user with the system 110. The user component 302 may include an input component 308, a priority parameter component 320, and a results component 328. The AI component 304 may include various modules for implementation of the first artificial intelligence component 206, the second artificial intelligence component 216, the CNN model for the generation of the content model 222, the visual saliency prediction, and the evaluation of the content model 222. The organization component 306 may include an interface for feeding a brand guideline set 316 such as the content record 204, and the rule record 218 to the system 110.

The input component 308 may provide input to the system 110 from various data sources, as mentioned above. The input may be in form of any kind of graphic elements such as an image, a flyer, a document page, a screenshot of a webpage, and the like. Additionally, the input may be in the form of a URL to a website, a list of discrete elements related to an organization, data from social media, and the like. In an example embodiment, the input may be an extract from a video with an image integrated into it, for example, a video with images of a product integrated therein. In an example embodiment, various methods such as a manual upload method, a drag and drop method may be deployed for uploading the input to the AI component 304.

The AI component 304 may include a segmentation module 310. The segmentation module 310 may process each type of input for extracting information therefrom. The segmentation module 310 may extract single design elements from an input such as a design. The extracted information may be used by the AI component 304 for further analysis. The segmentation module 310 may extract various design elements such as an image, a text, a title, and the like from the input. The segmentation module 310 may operate according to the type of input received. For example, the segmentation module 310 may use a page source code to find and separate images, texts, titles from a webpage.

The segmentation module 310 may use a structure such as Hypertext Markup Language (HTML) and stylesheets such as Cascading Style Sheets (CSS) of the page source code to locate and retain bound elements together. For example, a title and its underlying text may be kept together as separate elements related to each other. In an example embodiment, the segmentation module 310 may leverage onto various AI techniques to segment the input into a list of design elements. The segmentation module 310 may isolate images, backgrounds, texts, titles, and legal notices from an input such as a design, an image, a document, and the like. Various AI techniques such as OCR, sematic tensor flow may be used to transform the image into text. If the input may be already segmented, the segmentation module 310 may not be required to perform any additional analysis. In examples where the input may be an extract from a video with an image integrated therein, the segmentation module 310 may acknowledge a presence of two (2) elements (a video and an image) in the input set. In examples where the input may be a list of discrete design elements, the segmentation module 310 may acknowledge them for further analysis.

The information extracted by the segmentation module 310 may provide input for the priority parameter component 320. The priority parameter component 320 may identify the content creation attributes 208 preponderant to processing the content creation requirement 202. For example, the priority parameter component 320 may include the selection of a format selection for which the visual and digital content may be optimized. The formats may include various advertising platforms for which the content model 222 may be created such as, a Google Display Network®, a Facebook Format®, a customized format for an organization, and the like. The system 110 may create the content model 222 for multiple formats at the same time, thereby reducing the amount of time and resources required for content optimization.

Further, the priority parameter component 320 may provide an interface where a user may select various priority parameters that may be included for the creation and evaluation of the content model 222. Additionally, the priority parameter component 320 may provide an interface for storing and accessing historical data related to the various visual and digital content optimization operations. In an example embodiment, a user may be required to verify the design elements have the right place and size compared to the brand guidelines and designer rules. The verification may be done through a selection of a type of design element for various content creation attributes 208. For example, the priority parameter component 320 may present the content creation attributes 208 (identified by the first artificial intelligence component 206) such as a product image to a user and require user input in verifying if it may be an image. In an example embodiment, the system 110 may be configurable for automatically verifying the content creation attributes 208 that may be identified by the first artificial intelligence component 206. The priority parameter component 320 may identify the content creation attributes 208 and the send the same as an input to various modules of the AI component 304.

In accordance to various embodiments of the present disclosure, the priority parameter component 320 may include parameters such as position (e.g., x, y coordinates, x, y, z, rotation, width/height, etc.), color correction (e.g., brightness, contrast, opacity, etc.), transformation (e.g., boarder (weight/radius), crop (x, y, width, height), etc.), or other parameters. In some examples, a user or other source may provide additional input to these parameters. For example, value, increment, combination, or other adjustments may be provided for these or other parameters.

The organization component 306 may include a brand guideline set 316 and a design input set 318. The brand guideline set 316 may be similar to the content record 204. The design input set 318 may be similar to the rule record 218. In an example embodiment, the AI component 304 may include a guideline extractor 312. The guideline extractor 312 may extract the information from the brand guideline set 316. In an example embodiment, the guideline extractor 312 may implement the first artificial intelligence component 206 to extract the information from the brand guideline set 316. The guideline extractor 312 may classify the brand guideline set 316 into the exhibits 210 and identify the exhibit annotation 214 therefrom. The system may be fed by the brand guidelines, which may be a document that contains all the rules that apply to visual content created by or for a brand by the brand guideline set 316. The conditions in the brand guidelines may be extracted by the guideline extractor 312 and stored as basic instructions in a design generation module of the AI component 304.

Further, the AI component 304 may include a design practice extractor 314. The design practice extractor 314 may identify the rules 220 from the design input set 318. The design practice extractor 314 may implement the second artificial intelligence component 216 to identify the rules 220 from the design input set 318. The exhibit annotation 214 from the guideline extractor 312, the rules 220 from the design practice extractor 314, and the content creation attributes 208 from the priority parameter component 320 may be sent to the design generation module 322 included in the AI component 304. The system may be fed by the rules 220, which may be a document that contains various design-related inputs from a human expert by the design input set 318. The rules 220 in the design input set 318 may be extracted by the design practice extractor 314 and stored as basic instructions in a design generation module of the AI component 304.

The design generation module 322 may create the content models 222 based on the exhibit annotation 214 from the guideline extractor 312, the rules 220 from the design practice extractor 314, and the content creation attributes 208 from the priority parameter component 320. The content models 222 may include various design parameter variations as allowed by the rules 220, the exhibits 210, and the content creation attributes 208. The design generation module 322 may create various designs (the content models 222) by assembling the discrete elements (content creation attributes 208) as identified preponderant by the data segmenter 130. The design generation module 322 may apply various design constraints as applied by a user while verifying the content creation attributes 208.

The design generation module 322 may create various designs based on random values such as a font size, a design element positions, a font style, element effects, and the like within a range defined within the content creation attributes 208 or defined by the user. For example, a user may specify that in a case of insertion of content in an image (or other dynamic content), the design element to insert may be placed inside a scene. The design generation module 322 may be fed by different modules as mentioned to generate unique model layouts 224 from information provided by those modules. In order to create multiple designs, the design generation module 322 may change the position, size, text fonts, and effects of all elements.

The design generation module 322 may check each of the designs generated for congruence with the rules 220, and the exhibits 210 as provided by the design practice extractor 314 and the guideline extractor 312. A requirement for adherence to the rules 220 may reduce the count of potential model layouts 224 generated, thus reducing the amount of time required for the overall process, and also increases the quality of the output. Additionally, the rules 220 may ensure that the final layout may be visually appealing due to congruence with design inputs. A requirement for adherence to the exhibits 210 (brand guidelines) may ensure that model layout 224 constructed by the design generation module 322 may be aligned with the ones expected by the brand for augmenting brand identity and enhancing brand visibility in the content model 222. The design generation module 322 may discard any designs that do not conform to either of the rules 220 and the exhibits 210. These two sets of constraints eliminate various content models 222 that could be highly scored during the evaluation of the content model 222, thereby increasing the quality of the results generated. Additionally, the above-mentioned constraints may have the effect of reducing the computational load on the system 110 since designs that do not meet the brand guidelines and the rules 222 may not be further evaluated.

Further, the AI component 304 may include a design evaluator 324. The content models 222 may be submitted to the design evaluator 324 for evaluation. The design evaluator 324 may evaluate the model layout 224 of the content model 222 and provide feedback on the whole design of the content model 222. The design evaluator 324 may also provide feedback on the discrete elements. The feedback may be used by the design generation module 322 to adjust the variables and improve the generated content model 222. The design evaluator 324 may perform the visual saliency prediction for each design element comprised in the model layout 224. The design evaluator 324 may conduct evaluation over various evaluation parameters (mentioned above with respect to description for FIG. 1 and FIG. 2) to ensure that the visual and digital content in the content model 222 may conform to an industry-standard in terms of compliance and resilience. The design evaluator 324 may determine the evaluation score 226 for each design generated by the design generation module 322, taking the priority list (content creation attributes 208) as a parameter. The design evaluator 324 may perform a visual saliency analysis implemented using an artificial intelligence model trained with visual saliency data to predict specific portions of the content model 222 that may attract maximum people's attention. The design evaluator 324 processes the model layout 224 generated by the design generation module 322 and evaluates their visual performance. The design evaluator 324 may provide information on the entire model layout 224 and also on each of the individual design elements comprised therein.

The AI component 304 may further include a design selection component 326. The design selection component may select a content model 222 having the evaluation score above the threshold evaluation score. The design selection component 326 may select from all the generated designs the one with the best visual impact and with the closest value to the ones provided by the rules 220 and the exhibits 210. The design selection component 326 may identify the selected content model 228. In an example embodiment, the design selection component 326 may review the output from the design evaluator 324. The design selection component 326 may compare the output with the rules 220 and the exhibits 210. In an example, none of the models evaluated by the design evaluator 324 may meet the requirements, the design selection component 326 may provide a signal to the design generation module 322 to continue the generation of the content models 222. In an example, a model from the evaluated by the design evaluator 324 may be visually impactful and may meet the requirements, then the design selection component 326 may provide a signal to the design generation module 322 to stop the generation of the content models 222. In an example embodiment, the output may be the selected content model 228.

As mentioned above, the user component 302 may include the results component 328. The results component 328 may display the output from the design selection component 326 to a user through a user interface where users may export the model layout 224 (such as an image, a document, and the like) of the selected content model 228. In an example embodiment, the user may manually reject the output, which in return may re-launch the generation of the content models 222.

The AI component 304 may use machine learning to enable a feedback-based and connected visual and digital optimization system. The AI component 304 may therefore be trained to "think" and "operate" as a skilled designer. By providing an AI-based and machine learning analytics technique as described herein, the AI component 304 may have the ability to recognize discrete objects or elements in a mock-up in a design or layout, understand how they fit within a design, categorize them in proper categories based on intended functions, and rearrange them into a suitable hierarchical structure for any particular purpose, design, or layout, confirm congruence of generated designs with the rules 220 and the exhibits 210.

Figure 4:
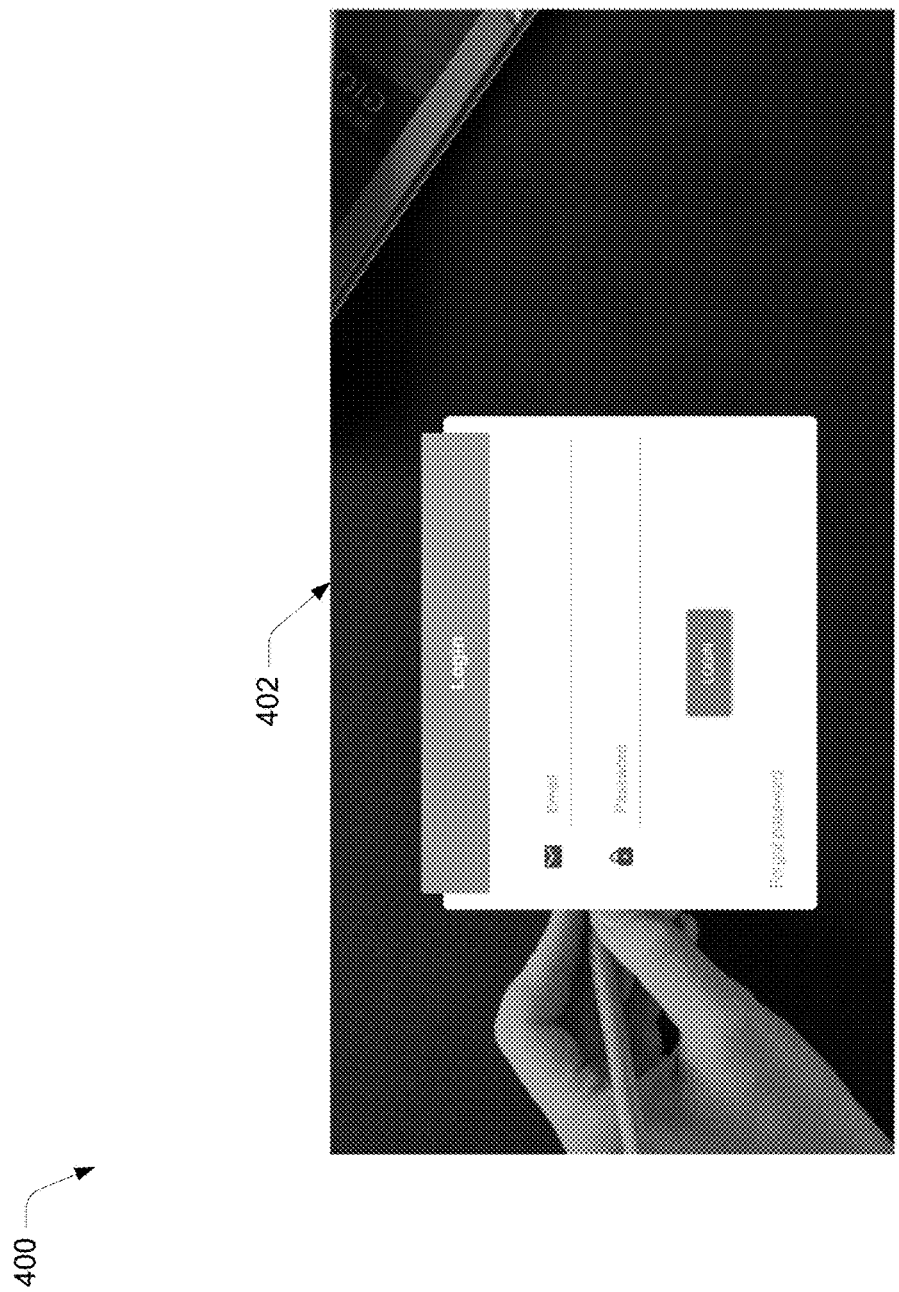
FIG. 4 illustrates a pictorial representation of initiating the visual and digital content optimization using the visual and digital content optimization system, according to an example embodiment of the present disclosure.

FIG. 4 illustrates a pictorial representation 400 of initiating the visual and digital content optimization using the visual and digital content optimization system, according to an example embodiment of the present disclosure. The pictorial representation 400 illustrates a user interface 402. The user interface 402 may be an exemplary interface of the system 110 that may be used by a user to interact with the system 110. A user may create a unique identification with the system 110 for storing, securing, and accessing various visual and digital content optimization operations.

Figure 5:
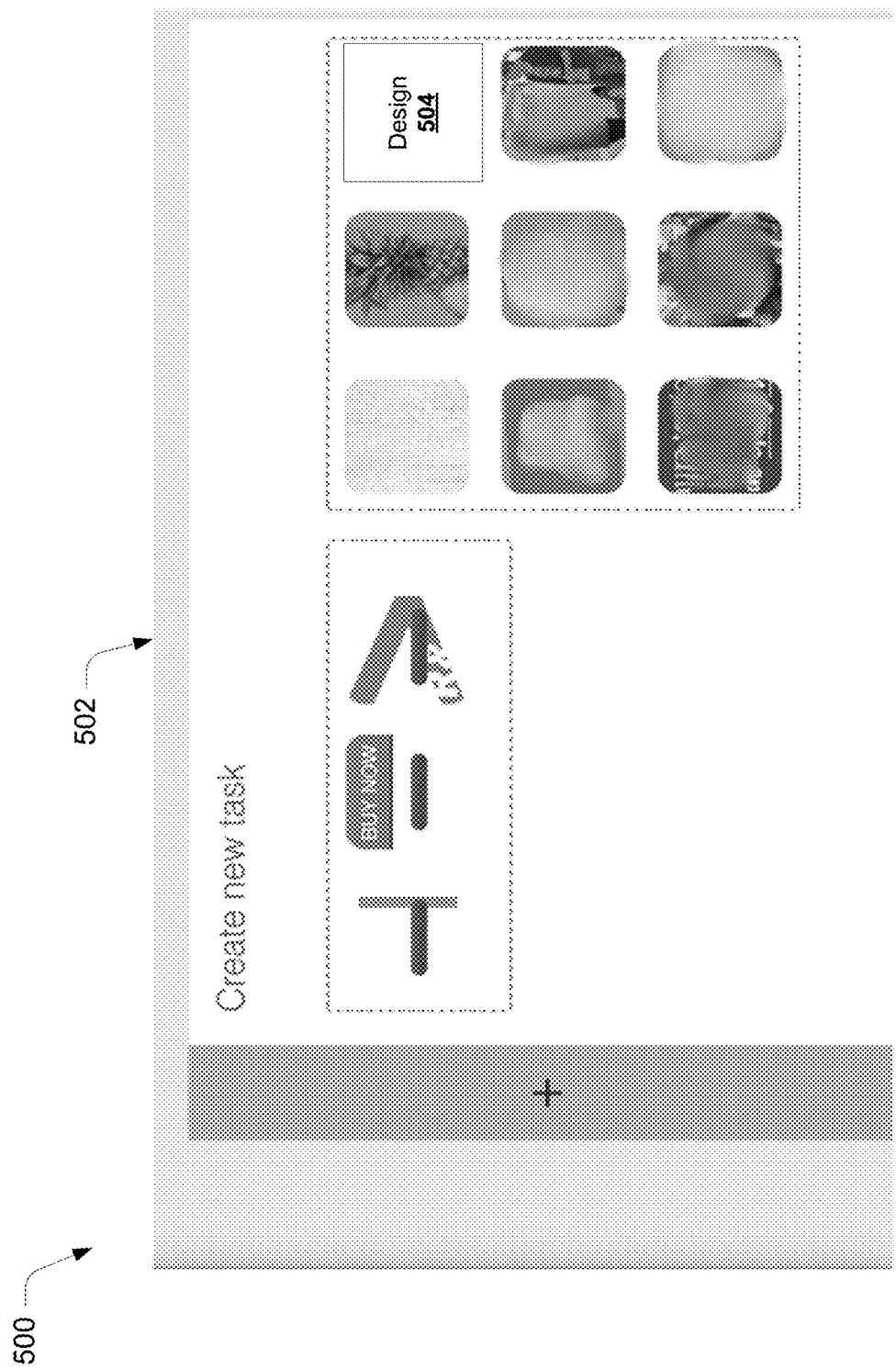
FIG. 5 illustrates a pictorial representation of creating new content for the visual and digital content optimization, according to an example embodiment of the present disclosure.

FIG. 5 illustrates a pictorial representation 500 of creating new content for the visual and digital content optimization, according to an example embodiment of the present disclosure. The pictorial representation 400 illustrates a user interface 502. The user interface 502 may be an exemplary interface of the system 110 that may be used by a user to initiate the content creation requirement 202.

Figure 6:
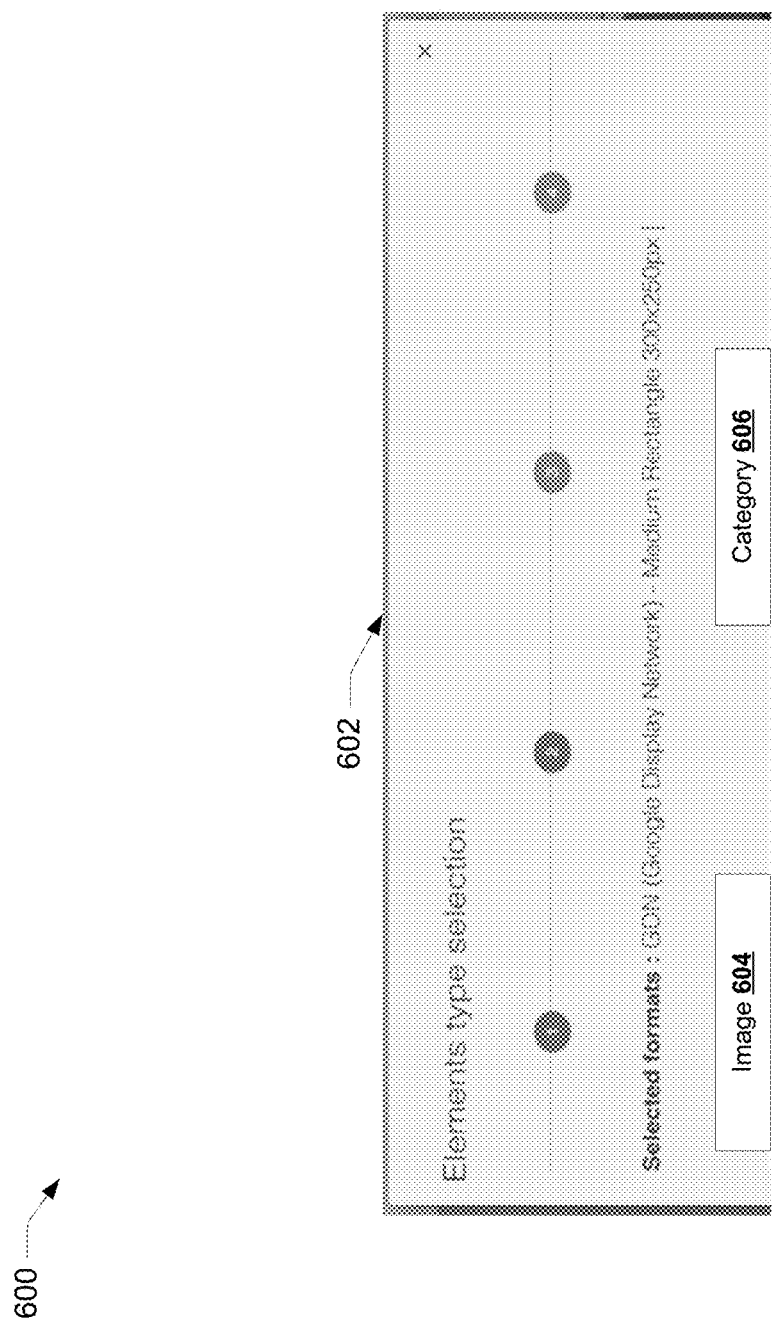
FIG. 6 illustrates a pictorial representation of providing a content record for the visual and digital content optimization, according to an example embodiment of the present disclosure.

FIG. 6 illustrates a pictorial representation of providing the content record 204 for the visual and digital content optimization, according to an example embodiment of the present disclosure. The pictorial representation 600 illustrates a user interface 602. The user interface 602 may be an exemplary interface of the priority parameter component 320 that may be used by a user to verify the design elements that have the right place and size compared to the brand guidelines and designer rules (mentioned above with respect to description for FIG. 3). Additionally, the user interface 602 may display various output formats such as an image, a document, and the like that may have been selected by a user. In an exemplary embodiment, the results component 328 may display the output from the design selection component 326 to a user through the user interface 602 where users may export the model layout 224 (such as an image, a document, and the like) of the selected content model 228.

Figure 7:
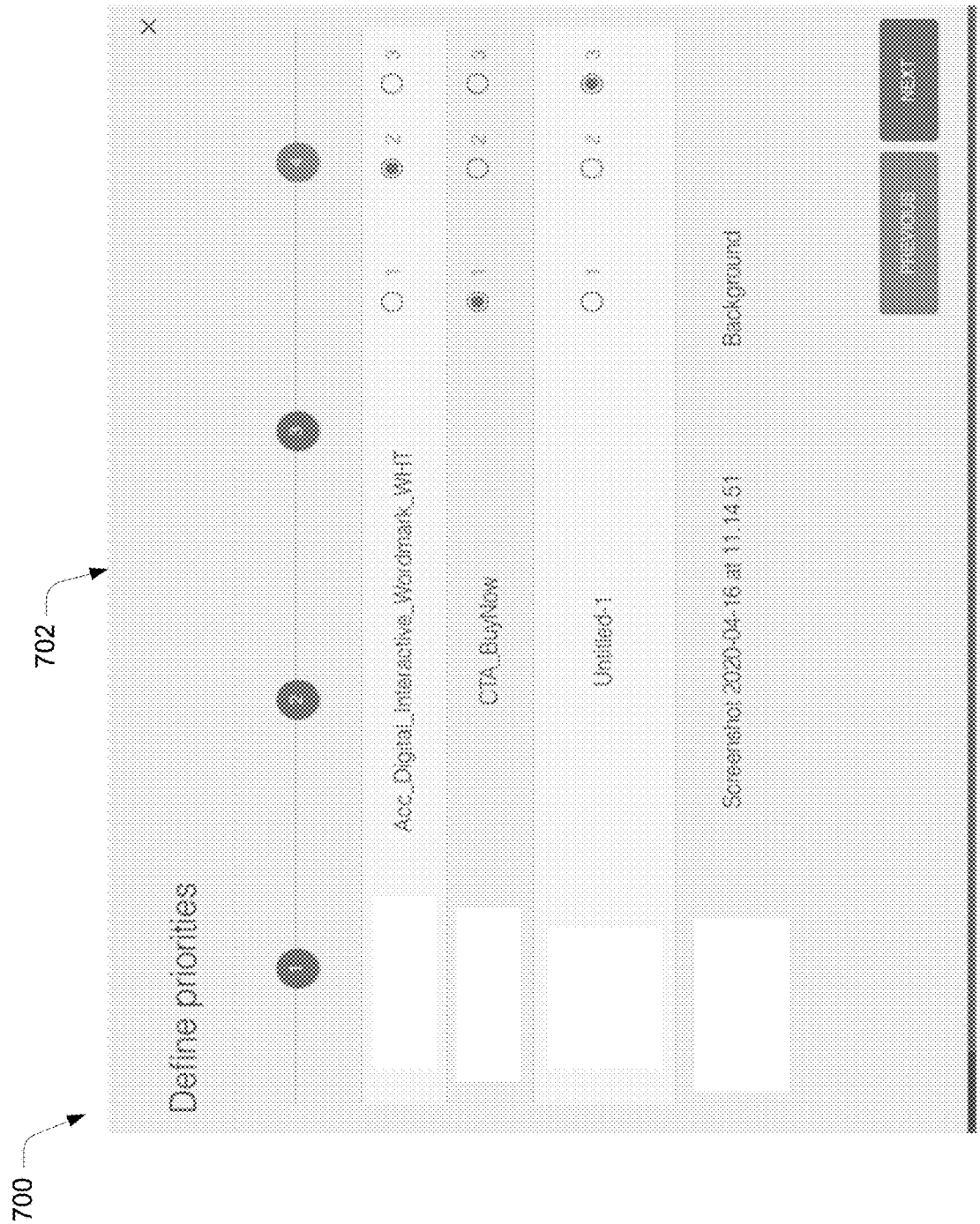
FIG. 7 illustrates a pictorial representation of providing a priority parameter list for the visual and digital content optimization, according to an example embodiment of the present disclosure.

FIG. 7 illustrates a pictorial representation 700 of providing a priority parameter list for the visual and digital content optimization, according to an example embodiment of the present disclosure. The pictorial representation 700 illustrates a user interface 702. The user interface 702 may be an exemplary interface of the priority parameter component 320 that may be used by a user to define priority parameters for processing the content creation requirement 202 (mentioned above with respect to description for FIG. 1, FIG. 2 and FIG. 3).

Figure 8:
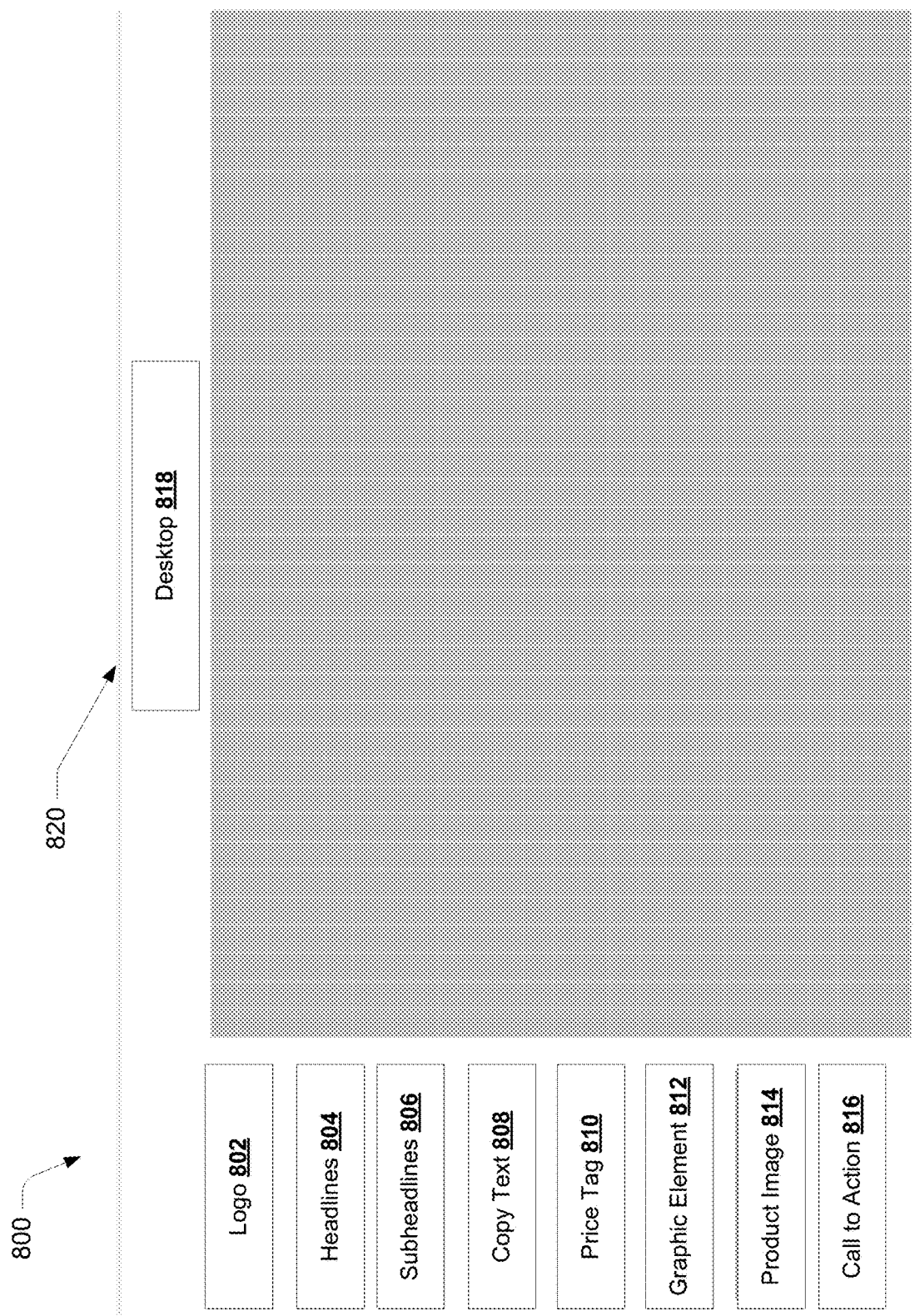
FIG. 8 illustrates a pictorial representation of initiating the creation of a content model for the visual and digital content optimization, according to an example embodiment of the present disclosure.

FIG. 8 illustrates a pictorial representation 800 of initiating the creation of the content model 222 for the visual and digital content optimization, according to an example embodiment of the present disclosure. The pictorial representation 800 illustrates a user interface 820. The user interface 820 may be an exemplary interface of the design generation module 322 that may be used by generating the content models 222. The user interface 820 may include a desktop 818, which may be an output device accessible to a user. The user interface 820 may illustrate various single design elements including a logo element 802, a headlines element 804, a sub-headlines element 806, a copy text element 808, a price tag element 810, a graphic element 812, a product image element 814, and a call to action element 816.

Figure 9:
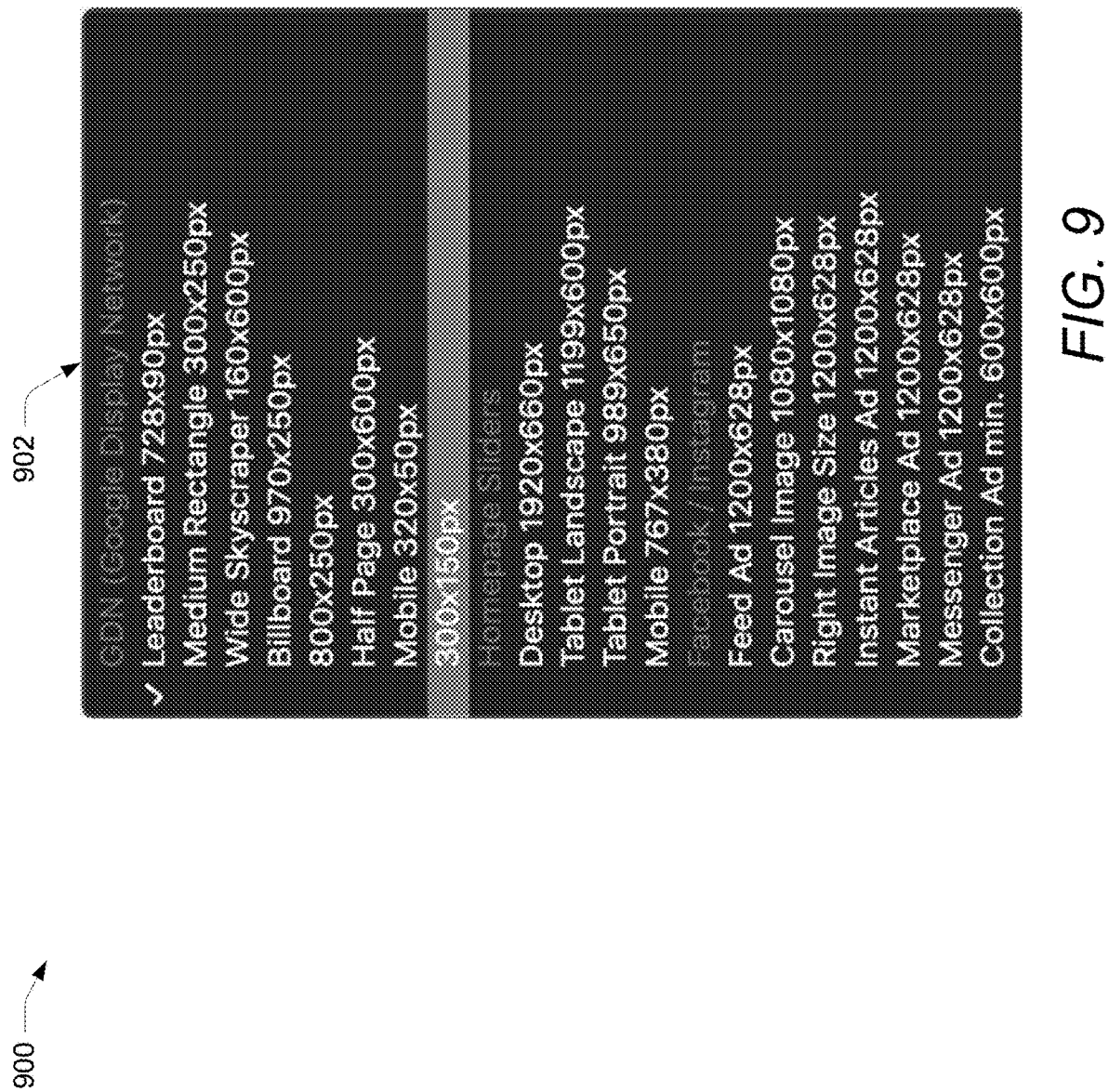
FIG. 9 illustrates a pictorial representation of a format selection for the visual and digital content optimization, according to an example embodiment of the present disclosure.

FIG. 9 illustrates a pictorial representation 900 of a format selection for the visual and digital content optimization, according to an example embodiment of the present disclosure. The pictorial representation 900 illustrates a list of formats 902. The list of formats 902 may include various formats for visual and digital content optimization that may be deployed by a user. For example, the list of formats 902 may include a Google Display Network®, a Facebook®/Instagram® format, or other formats. Further, the list of formats 902 may include various details related to each of the Google Display Network®, the Facebook®/Instagram® format, and other formats as illustrated.

Figure 10:
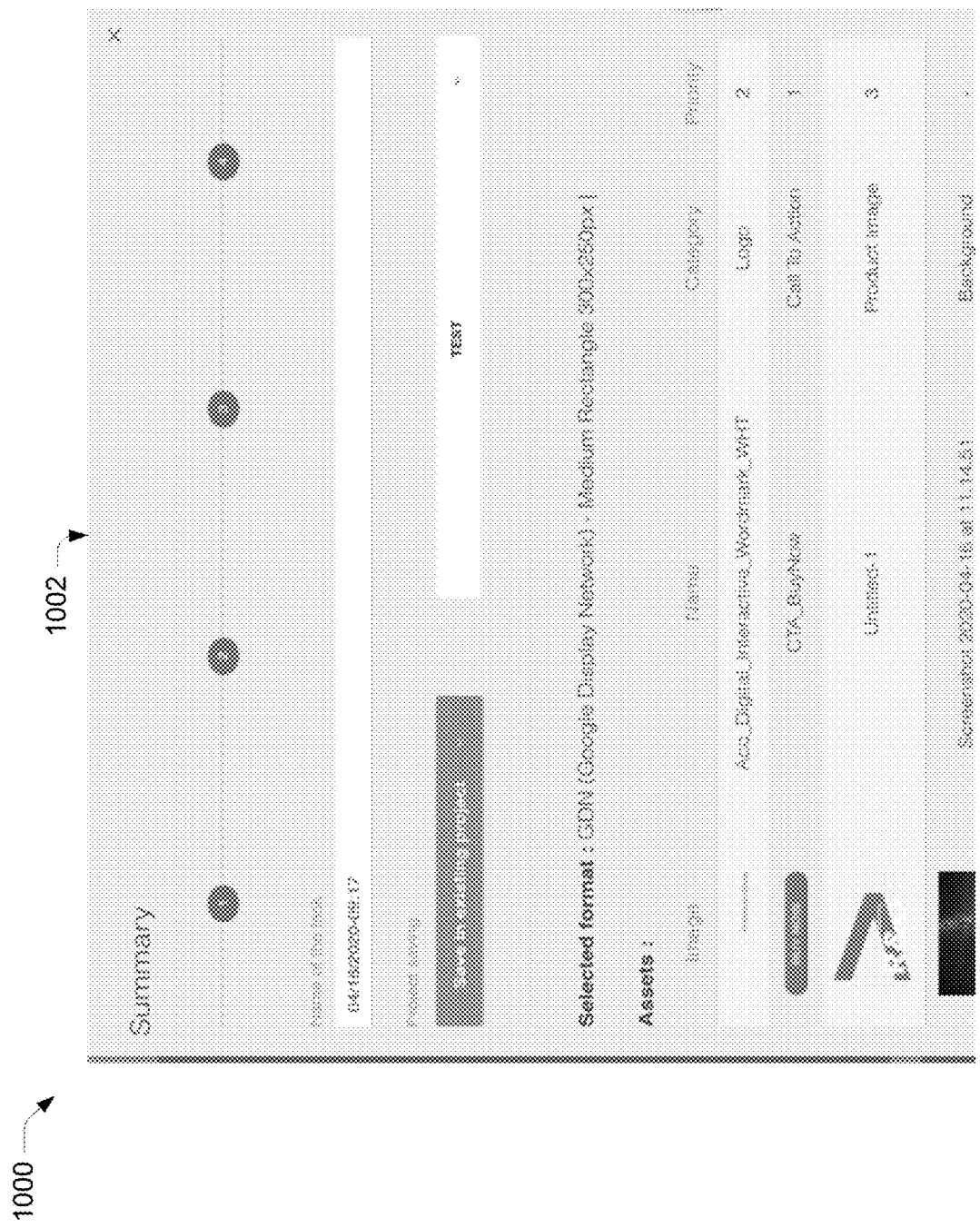
FIG. 10 illustrates a pictorial representation of a summary of a selected format and a plurality of rules for the visual and digital content optimization, according to an example embodiment of the present disclosure.

FIG. 10 illustrates a pictorial representation of a summary of a selected format and a plurality of rules for the visual and digital content optimization, according to an example embodiment of the present disclosure. The pictorial representation 1000 illustrates a user interface 1002. The user interface 1002 may be an exemplary interface of the priority parameter component 320 that may be used by a user to access a summary of the design elements and the priority parameters as identified by the first artificial intelligence component 206 and as verified by the user. (mentioned above with respect to description for FIG. 3).

Figure 11:
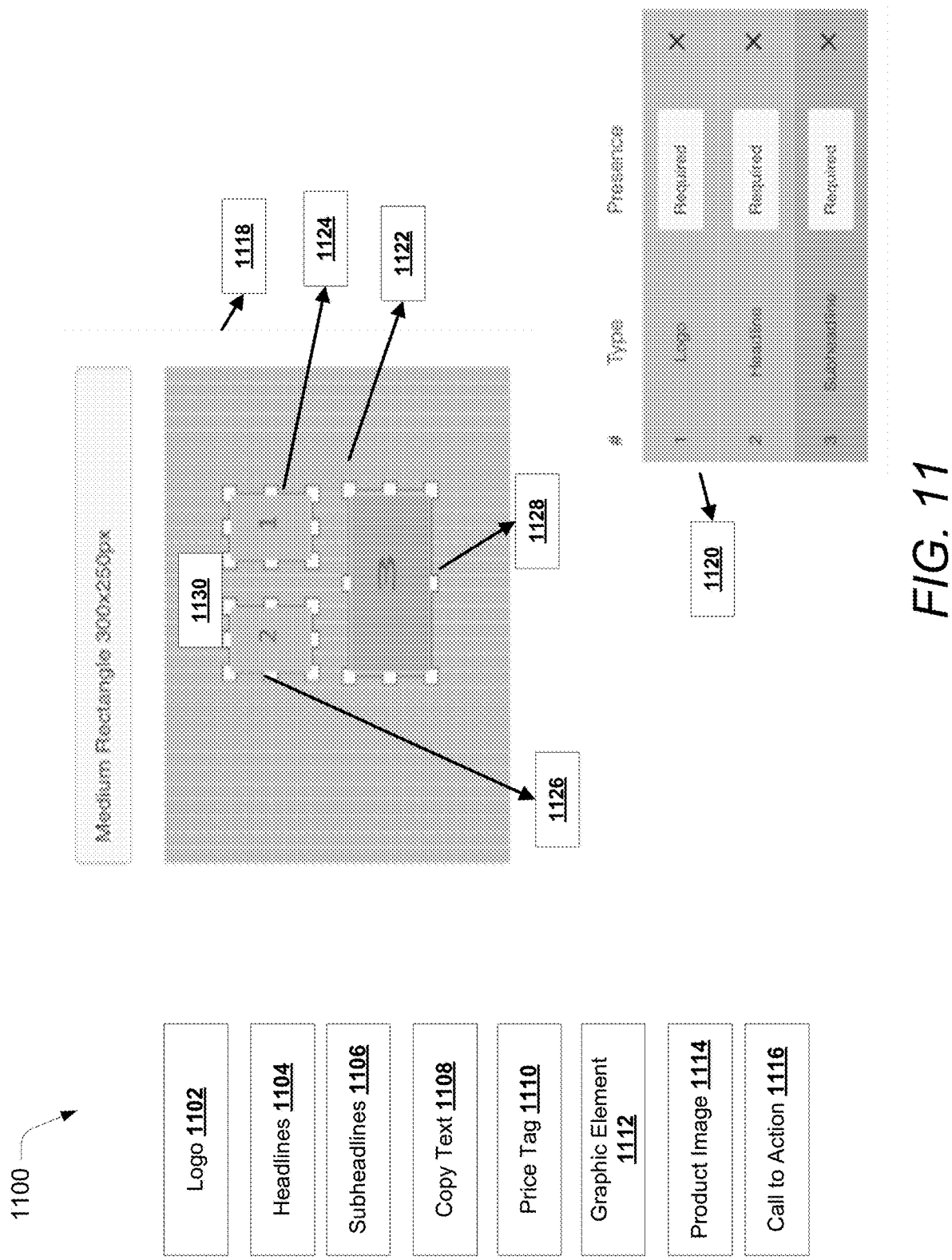
FIG. 11 illustrates a pictorial representation of the creation of a content model for visual and digital content optimization, according to an example embodiment of the present disclosure.

FIG. 11 illustrates a pictorial representation 1100 of creation of the content model 224 for visual and digital content optimization, according to an example embodiment of the present disclosure. The pictorial representation 1100 illustrates a user interface 1118. The user interface 1118 may be an exemplary interface of the design generation module 322 that may be used to create the content models 222. The user interface 1118 may illustrate the various design elements including a logo element 1102, a headlines element 1104, a sub-headlines element 1106, a copy text element 1108, a price tag element 1110, a graphic element 1112, a product image element 1114, and a call to action element 1116. Further, the pictorial representation 1100 may include a table 1120. The table 1120 may stipulate which of the design elements may be required to be present in the content model 222 and hence should be identified as the content creation attributes 208. The content creation attributes 208 may be single design elements identified by the first artificial intelligence component 206 as significant towards processing the content creation requirement 202.

The design generation module 322 may receive inputs from the guideline extractor 312 constraining the aforementioned single design elements for brand identity augmentation. The design generation module 322 may receive inputs from the design practice extractor 314 constraining the aforementioned single design elements for adherence to designer best practices. The design generation module 322 may generate at least one content model 1122 as illustrated based on inputs from the priority parameter component 320, the guideline extractor 312, and the design practice extractor 314 (mentioned above with respect to description for FIG. 3). The content model 1122 may be an example of one of the content models 222. The content model 1122 may include a first design element 1124, a second design element 1126, and a third design element 1128. The first design element 1124, the second design element 1126, and the third design element 1128 may be arranged in a pattern 1130. The pattern 1130 may be an exemplary model layout 224.

Figure 12:
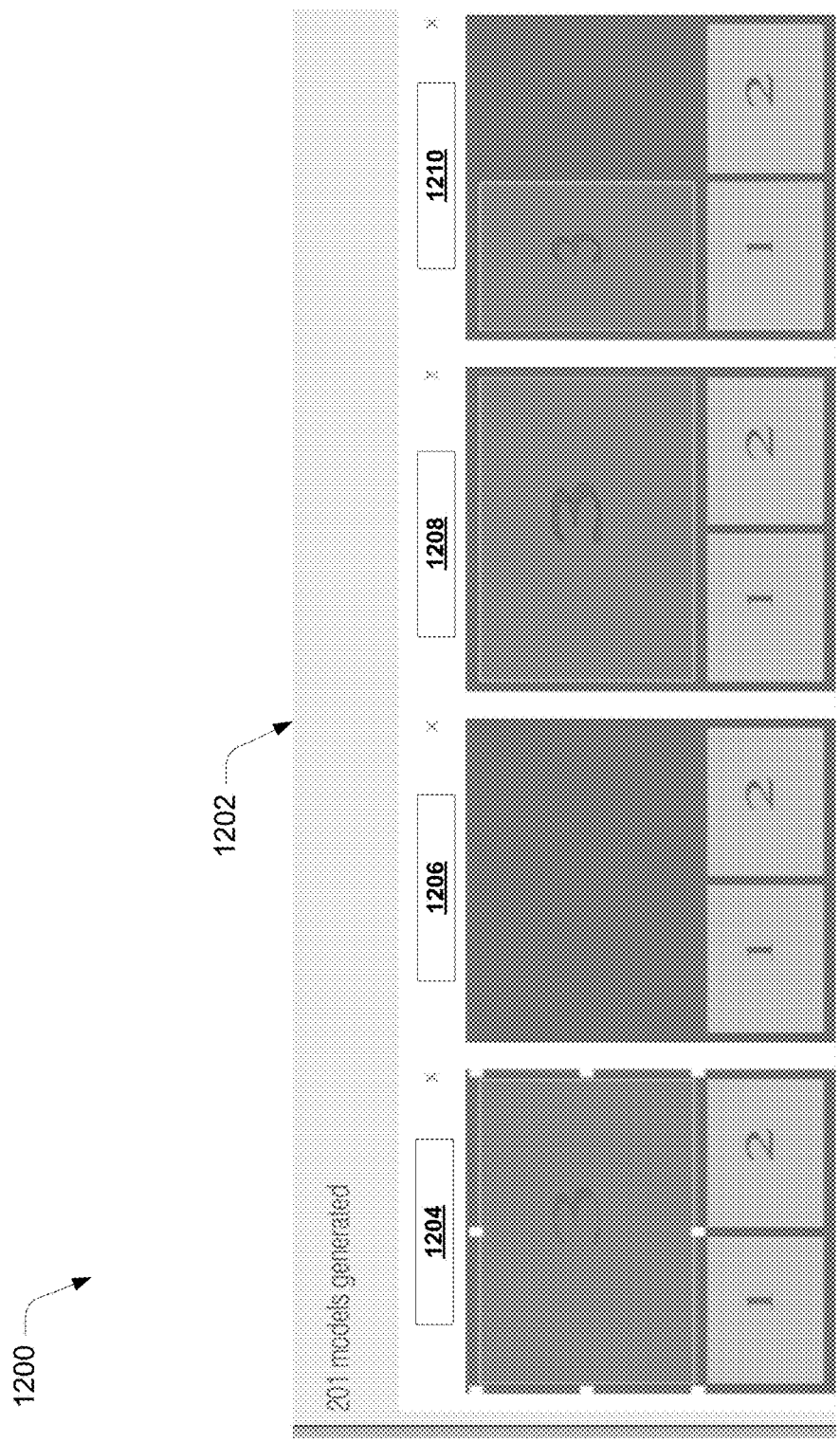
FIG. 12 illustrates a pictorial representation of multiple content models for visual and digital content optimization, according to an example embodiment of the present disclosure.

FIG. 12 illustrates a pictorial representation 1200 of multiple content models 222 for visual and digital content optimization, according to an example embodiment of the present disclosure. The pictorial representation 1200 illustrates a user interface 1202. The user interface 1202 may be an exemplary interface of the design generation module 322 that may be used to create the content models 222. The design generation module 322 may create a model 1204, a model 1206, a model 1208, and a model 1210 based on inputs received from the priority parameter component 320, the guideline extractor 312, and the design practice extractor 314. The model 1204, the model 1206, the model 1208, and the model 1210 may illustrate include the first design element 1124, the second design element 1126, and the third design element 1128 may be arranged in different patterns as illustrated, which may be various examples of the model layout 224. Hence, the system 110 may generate different model layouts 224 from the same design elements.

Figure 13:
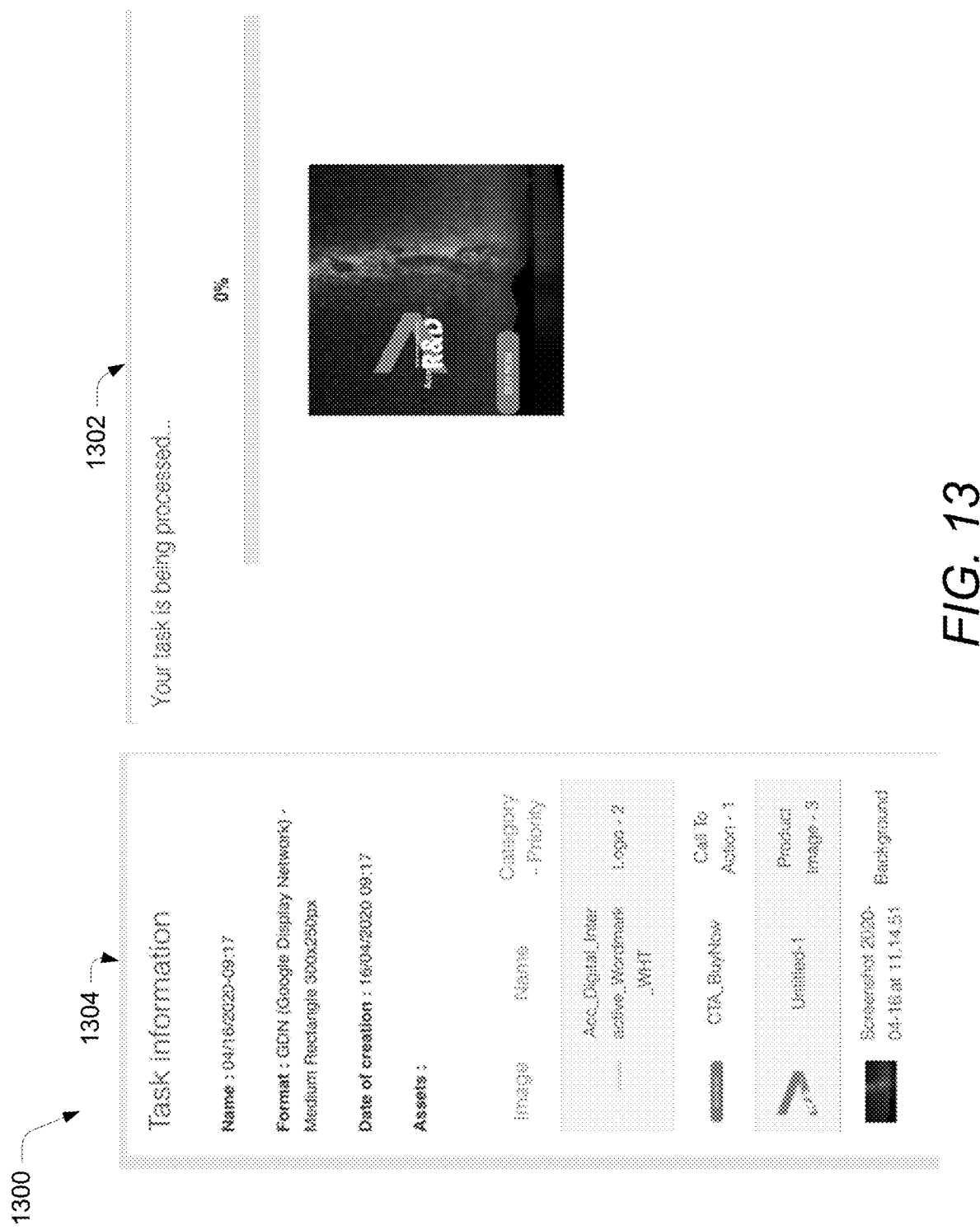
FIG. 13 illustrates a pictorial representation of a summary of a selected format and a plurality of rules being used for visual and digital content optimization, according to an example embodiment of the present disclosure.

FIG. 13 illustrates a pictorial representation 1300 of a summary of the selected format and the rules 220 being used for visual and digital content optimization, according to an example embodiment of the present disclosure. The pictorial representation 1300 may illustrate a summary 1304. The summary 1304 may include various priority parameters and the rules 220 used to generate the content models 222. Further, the pictorial representation 1300 illustrates a pictorial representation 1302 wherein a process for identification of the selected content model 228 may be underway.

Figure 14A:
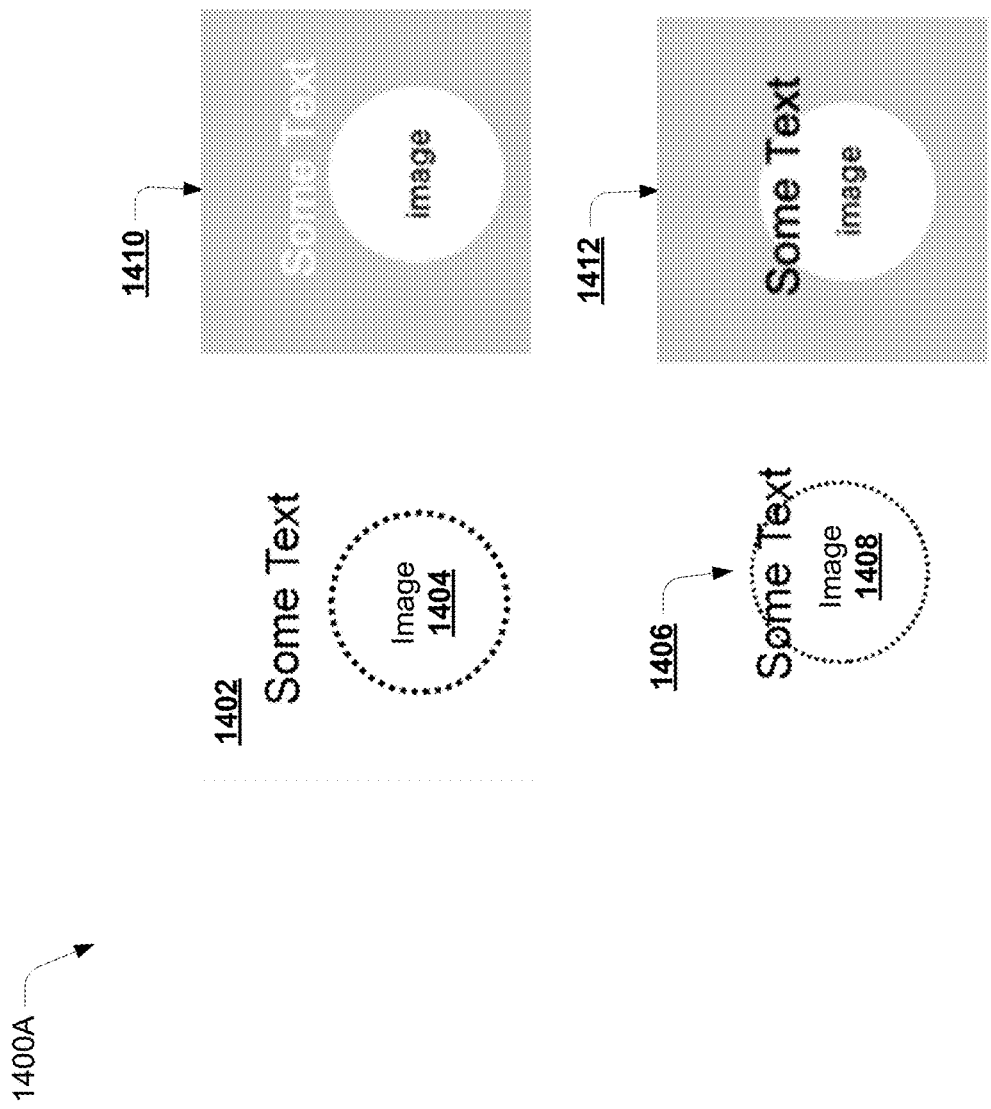

FIGS. 14A and 14B illustrate a design evaluation and scoring process for visual and digital content optimization, according to an example embodiment of the present disclosure. For sake of brevity and technical clarity the FIGS. 14A and 14B may be described together. The FIGS. 14A and 14B illustrate the evaluation of the content models 222 as an exemplary embodiment of the present disclosure. As mentioned above, the evaluation of the content models 222 may include an analysis of the visual saliency features, the readability indicator, the aesthetic value 230, the accessibility indicator for color-blind users, and safety checks.

FIG. 14A illustrates a media 1402 and a media 1406. The media 1402 may include a text portion and an image 1404, wherein the text portion may be separate from the image 1404. The media 1406 may include a text portion and an image 1408, wherein the text portion may overlap with the image 1408. The design evaluator 324 may implement various AI techniques mentioned with respect to FIGS. 1-3 to create an evaluation 1410 for the media 1402 and an evaluation 1412 for the media 1406. FIG. 14B illustrates results for the evaluation 1410 for the media 1402 and the evaluation 1412 for the media 1406. As illustrated the image 1404 may have a better readability score compared to the image 1408 since the text does not overlap the image 1404. However, the image 1408 has a better accessibility score as the contrast of the black text with the background is higher than the white text of the image 1404 for people with or without color blindness. It may be appreciated that that changing the weights of the criteria while evaluating may impact the final evaluation and selection.

Figure 15A:
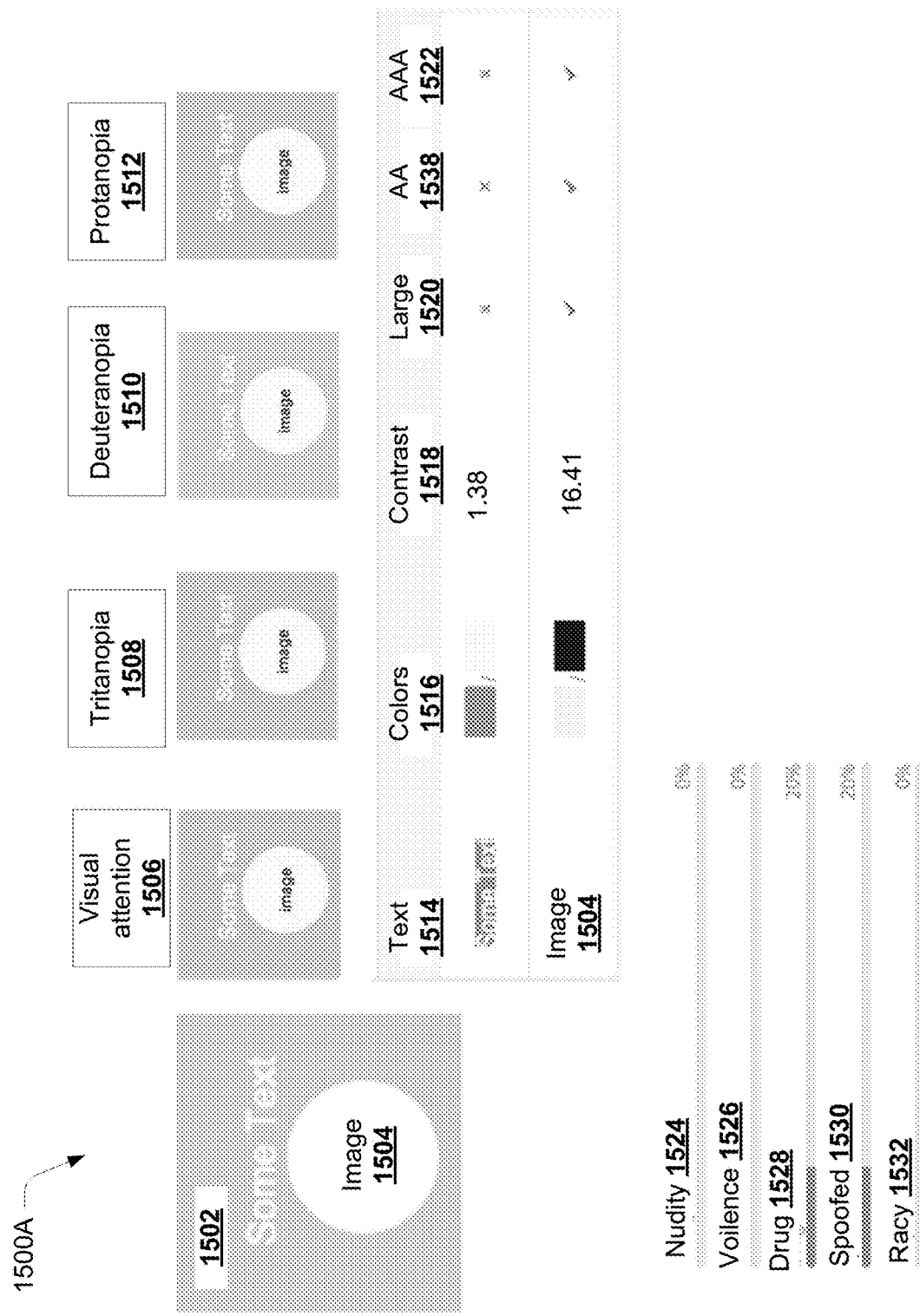
FIGS. 15A and 15B illustrate a set of evaluation parameters for visual and digital content optimization, according to an example embodiment of the present disclosure.
Figure 15B:
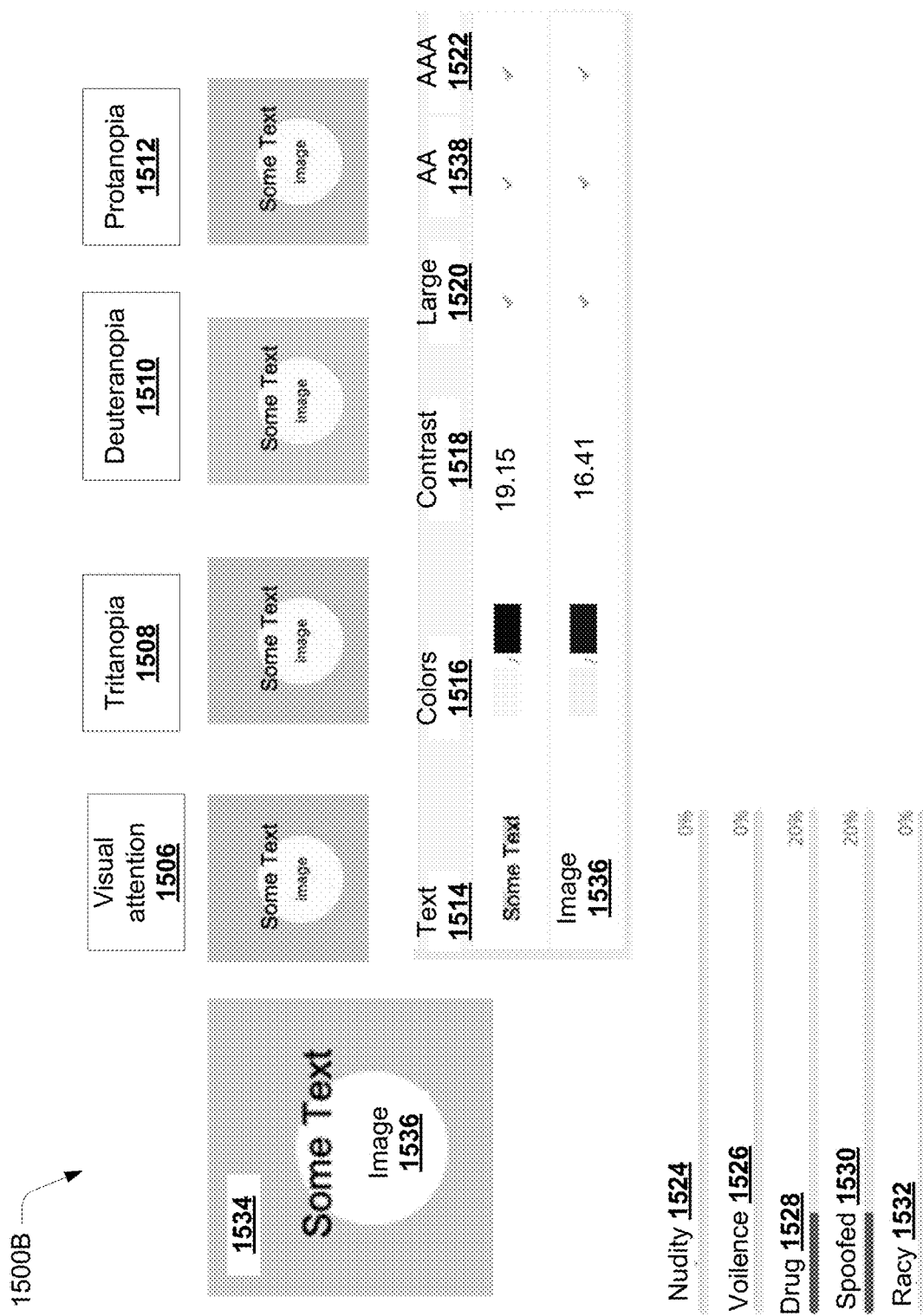

FIGS. 15A and 15B illustrate a set of evaluation parameters for visual and digital content optimization, according to an example embodiment of the present disclosure. For sake of brevity and technical clarity the FIGS. 15A and 15B may be described together. The FIGS. 15A and 15B illustrate the evaluation of the content models 222 for accessibility indicator for color-blind users and safety checks. The FIG. 15A illustrates a media 1502 including an image 1504 and a text portion, wherein the text portion may be separate from the image 1504. FIG. 15B illustrates a media 1534 including an image 1536 and a text portion, wherein the text portion may overlap with the image 1536. The design evaluator 324 may implement various AI techniques mentioned with respect to FIGS. 1-3 for creating a visual saliency prediction, determine the accessibility indicator for color-blind users, determine the readability of the content in a model, and perform the safety checks for the media 1502 and the media 1534.

Further, FIGS. 15A and 15B illustrate an image 1508, an image 1510, and an image 1512. The image 1508 illustrates the media 1502 and the media 1534 as viewable to a person suffering from tritanopia respectively in FIGS. 15A and 15B. The image 1510 illustrates the media 1502 and the media 1534 as viewable to a person suffering from deuteranopia respectively in FIGS. 15A and 15B. The image 1512 illustrates the media 1502 and the media 1534 as viewable to a person suffering from protanopia respectively in FIGS. 15A and 15B. The FIGS. 15A and 15B illustrate a media 1506 including a visual saliency analysis for the media 1502 and the media 1534. Furthermore, FIGS. 15A and 15B illustrate a readability analysis for the text portion and the image 1504. The readability analysis may include a text analysis 1514, a color analysis 1516, a contrast analysis 1518, a text font analysis 1520. There may be a difference in the color analysis 1516 and the contrast analysis 1518 for the media 1502 and the media 1534 as illustrated.

The readability analysis may further include a check against guidelines, such as the Web Content Accessibility Guidelines 2.0 (WCAG 2.0), that quantify whether digital content is considered accessible to people with disabilities. The design evaluator 324 may perform a mid-range conformance level (denoted by "AA") check 1538 as per the WCAG 2.0 for the media 1502 and the media 1534. The design evaluator 324 may perform a highest conformance level (denoted by "AAA") check 1522 as per the WCAG 2.0 for the media 1502 and the media 1534.

Additionally, FIGS. 15A and 15B illustrate the safety checks for the media 1502. The safety checks may include a nudity check 1524, a violence check 1526, a drug presence check 1528, a spoofed content check 1530, a racy content check 1532. The design evaluator 324 may include an indication for all the aforementioned checks as illustrated. The results from the evaluation of the media 1502 and the media 1534 may be presented to a user.

Figure 16:
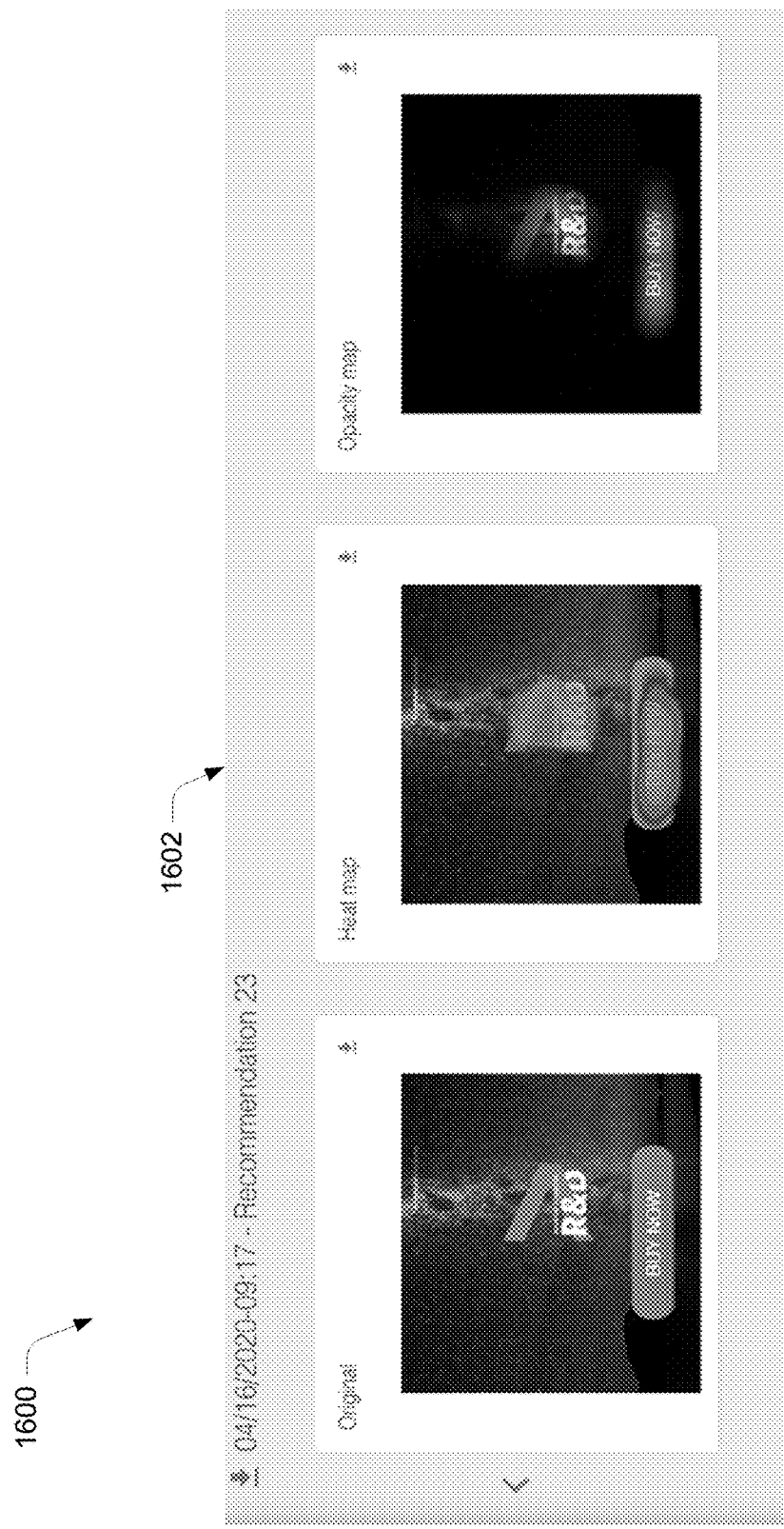
FIG. 16 illustrates a pictorial representation of a content creation model developed after visual and digital content optimization, according to an example embodiment of the present disclosure.

FIG. 16 illustrates a pictorial representation 1600 of a content creation model developed after visual and digital content optimization, according to an example embodiment of the present disclosure. The pictorial representation 1600 may include a user interface 1602. The user interface 1602 may illustrate the presentation of various evaluation results for the selected content model 228 to a user. For example, the design selection component 326 may present a heat map overlaid on the selected content model 228 to a user. The heat map may depict the visual saliency analysis of the selected content model 228. The design selection component 326 may present an opacity map overlaid on the selected content model 228 to a user. It should be appreciated that the design selection component 326 may present various other evaluation results for the selected content model 228 to a user that are not mentioned herein without diverting from the scope of the disclosure.

Figure 17:
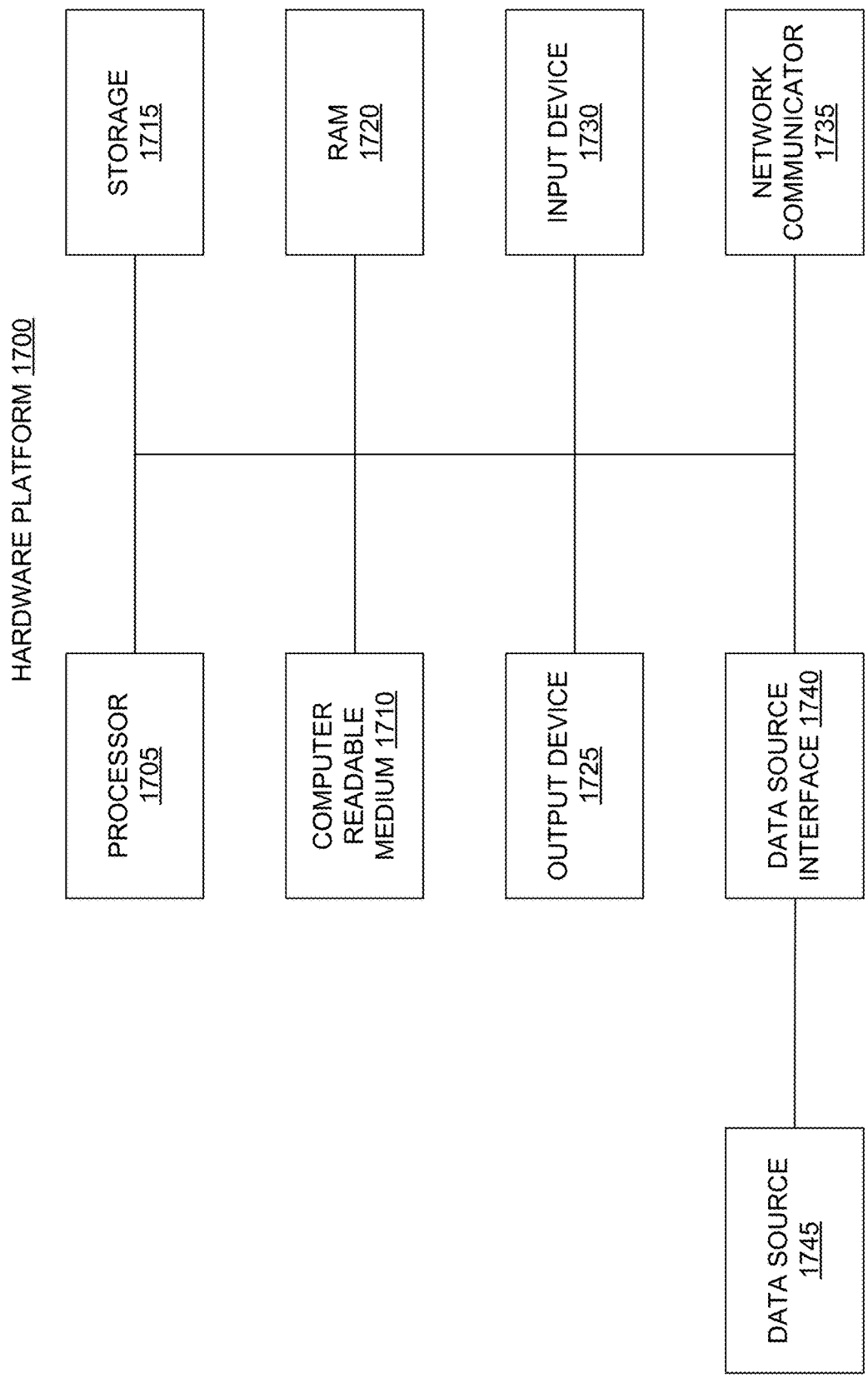
FIG. 17 illustrates a hardware platform for the implementation of a visual and digital content optimization system, according to an example embodiment of the present disclosure.

FIG. 17 illustrates a hardware platform 1700 for implementation of the system 110, according to an example embodiment of the present disclosure. For the sake of brevity, construction and operational features of the system 110 which are explained in detail above are not explained in detail herein. Particularly, computing machines such as but not limited to internal/external server clusters, quantum computers, desktops, laptops, smartphones, tablets, and wearables which may be used to execute the system 110 or may have the structure of the hardware platform 1700. The hardware platform 1700 may include additional components not shown and that some of the components described may be removed and/or modified. In another example, a computer system with multiple GPUs can sit on external-cloud platforms including Amazon Web Services, internal corporate cloud computing clusters, or other organizational computing resources, etc.

The hardware platform 1700 may be a computer system 1700 that may be used with the examples described herein. The computer system 1700 may represent a computational platform that includes components that may be in a server or another computer system. The computer system 1700 may execute, by a processor (e.g., a single or multiple processors) or other hardware processing circuit, the methods, functions and other processes described herein. These methods, functions and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system 1700 may include a processor 1705 that executes software instructions or code stored on a non-transitory computer-readable storage medium 1710 to perform methods of the present disclosure. The software code includes, for example, instructions to gather data and documents and analyze documents. In an example, the data segmenter 130, the data analyzer 140, and the modeler 150 may be software codes or components performing these steps.

The instructions on the computer-readable storage medium 1710 are read and stored the instructions in storage 1717 or in random access memory (RAM) 1720. The storage 1717 provides a large space for keeping static data where at least some instructions could be stored for later execution. The stored instructions may be further compiled to generate other representations of the instructions and dynamically stored in the RAM 1720. The processor 1705 reads instructions from the RAM 1720 and performs actions as instructed.

The computer system 1700 further includes an output device 1725 to provide at least some of the results of the execution as output including, but not limited to, visual information to users, such as external agents. The output device can include a display on computing devices and virtual reality glasses. For example, the display can be a mobile phone screen or a laptop screen. GUIs and/or text are presented as an output on the display screen. The computer system 1700 further includes input device 1730 to provide a user or another device with mechanisms for entering data and/or otherwise interact with the computer system 1700. The input device may include, for example, a keyboard, a keypad, a mouse, or a touchscreen. Each of these output devices 1725 and input devices 1730 could be joined by one or more additional peripherals. In an example, the output device 1725 may be used to display the results of the content creation requirement 202.

A network communicator 1735 may be provided to connect the computer system 1700 to a network and in turn to other devices connected to the network including other clients, servers, data stores, and interfaces, for instance. A network communicator 1735 may include, for example, a network adapter such as a LAN adapter or a wireless adapter. The computer system 1700 includes a data source interface 1740 to access data source 1745. A data source is an information resource. As an example, a database of exceptions and rules may be a data source. Moreover, knowledge repositories and curated data may be other examples of data sources.

Figure 18A:
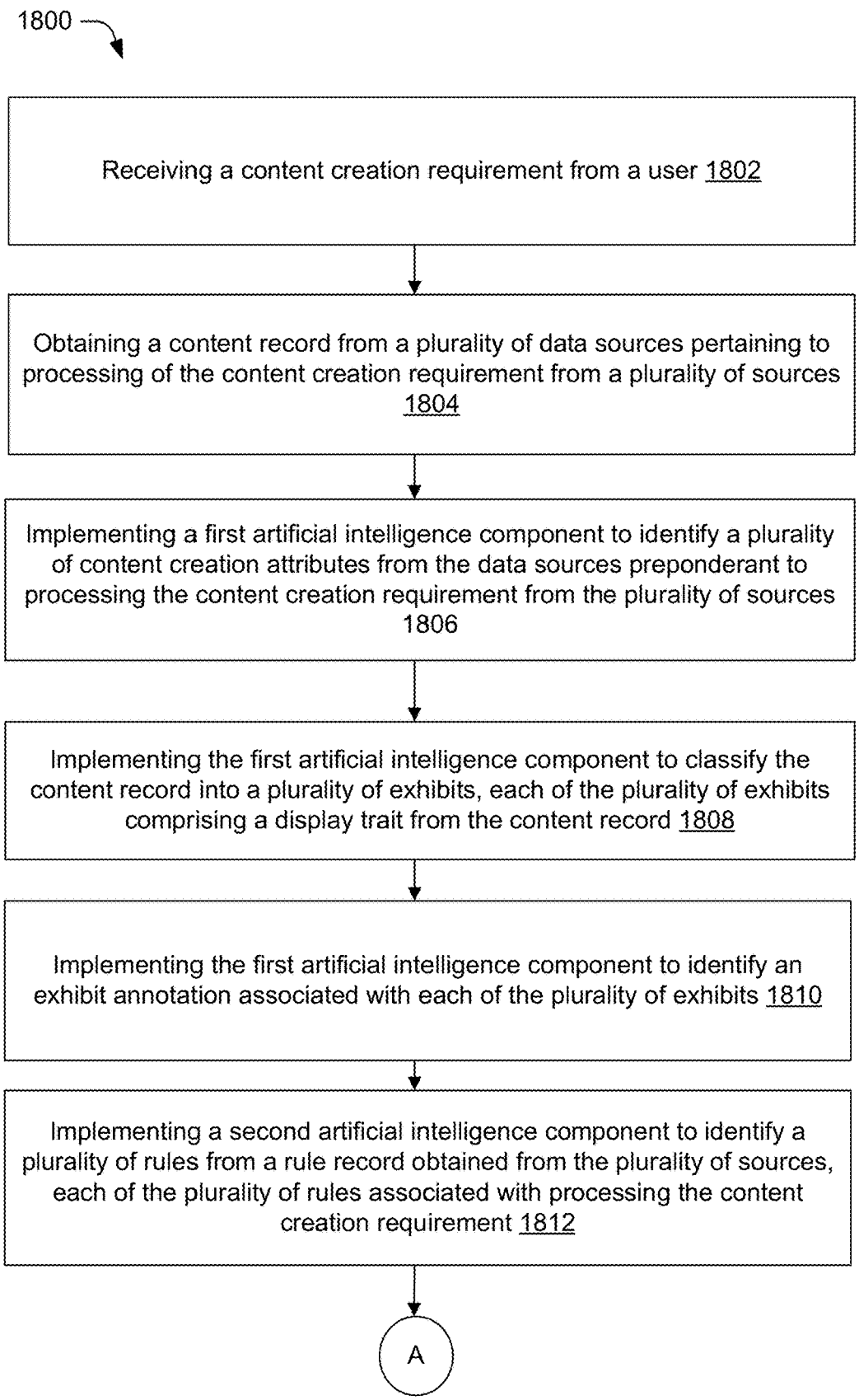
FIGS. 18A and 18B illustrate a process flowchart for visual and digital content optimization, according to an example embodiment of the present disclosure.
Figure 18B:
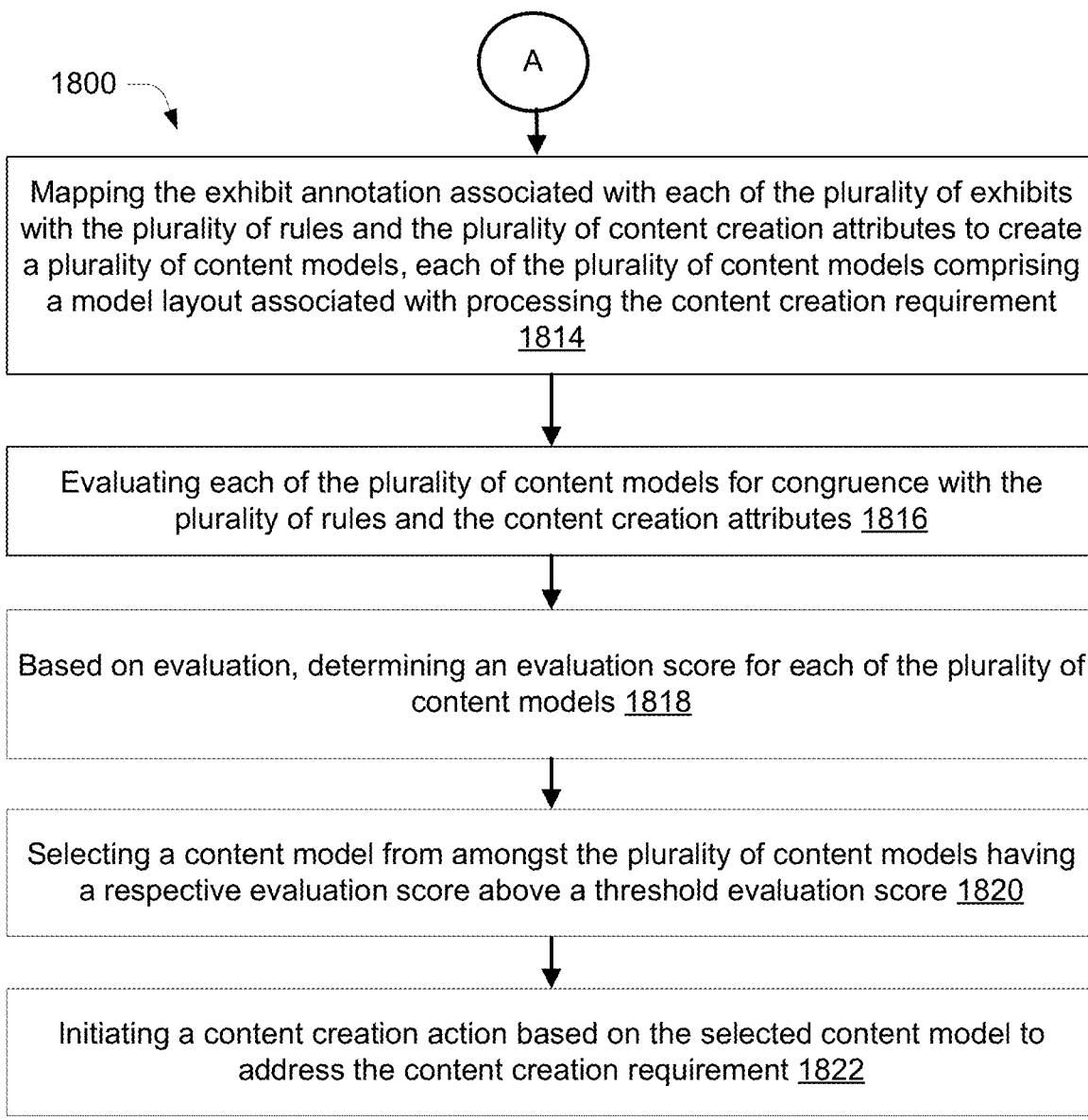

FIGS. 18A and 18B illustrate a process flowchart for baggage weight prediction using the visual and digital content optimization system 110, according to an example embodiment of the present disclosure. It should be understood that method steps are shown here for reference only and other combinations of the steps may be possible. Further, the method 1800 may contain some steps in addition to the steps shown in FIG. 18. For the sake of brevity, construction, and operational features of the system 110 which are explained in detail in the description of FIGS. 1-17 are not explained in detail in the description of FIGS. 18A and 18B. The method 1800 may be performed by a component of the system 110.

At block 1802, the content creation requirement 202 may be received from the user.

At block 1804, the content record 204 is obtained from a plurality of data sources pertaining to the processing of the content creation requirement 202.

At block 1806, the first artificial intelligence component 206 may be implemented to identify the plurality of content creation attributes 208 from the data sources preponderant to processing the content creation requirement 202.

At block 1808, the first artificial intelligence component 206 may be implemented to classify the content record 204 into the plurality of exhibits 210. Each of the plurality of exhibits 210 comprising the display trait 212 from the content record 204.

At block 1810, the first artificial intelligence component 206 may be implemented to identify the exhibit annotation 214 associated with each of the plurality of exhibits 210.

At block 1812, the second artificial intelligence component 216 may be implemented to identify the plurality of rules 220 from the rule record 218 obtained from the data sources. Each of the plurality of rules 220 may be associated with processing the content creation requirement 202.

At block 1814, the exhibit annotation 214 associated with each of the plurality of exhibits 210 may be mapped with the plurality of rules 220 and the plurality of content creation attributes 208 to create a plurality of content models 222. Each of the plurality of content models 222 may comprise the model layout 224 associated with processing the content creation requirement 202.

At block 1816, each of the plurality of content models 222 may be evaluated for congruence with the plurality of rules 220 and the content creation attributes 208.

At block 1818, based on the evaluation, the evaluation score 226 may be determined for each of the plurality of content models 222.

At block 1820, the content model 222 may be selected from amongst the plurality of content models 222 having a respective evaluation score 226 above a threshold evaluation score.

At block 1822, the content creation action may be initiated based on the selected content model 228 to address the content creation requirement 202.

In an example, the method 1800 may be practiced using a non-transitory computer-readable medium. In an example, the method 1800 may be computer-implemented.

The present disclosure provides efficient visual and digital content optimization that may account for the various factors mentioned above, amongst others. The present disclosure provides a robust approach for automatically creating a marketing content model capable of representing domain knowledge. Additionally, the marketing content model may be created for augmenting brand identity and conforming to content alignment rules preferred by a skilled designer. Furthermore, the marketing content model may categorically analyze various aspects of visual and digital content optimization for generating visual saliency predictions that may effectively and efficiently attract a wider client base.

One of ordinary skill in the art will appreciate that techniques consistent with the present disclosure are applicable in other contexts as well without departing from the scope of the disclosure.

What has been described and illustrated herein are examples of the present disclosure. The terms, descriptions, and figures used herein are set forth with respect to illustration only and are not meant as limitations. Many variations are possible within the spirit and scope of the subject matter, which is intended to be defined by the following claims and their equivalents in which all terms are meant in their broadest reasonable sense unless otherwise indicated.

We claim:

1. A system comprising:
a processor;
a data segmenter coupled to the processor, the data segmenter to:
receive a content creation requirement from a user;
obtain a content record from a plurality of sources pertaining to processing of the content creation requirement; and
implement a first artificial intelligence component to:
identify a plurality of content creation attributes from the plurality of sources preponderant to processing the content creation requirement;
classify the content record into a plurality of exhibits, each of the plurality of exhibits comprising a display trait from the content record; and
identify an exhibit annotation associated with each of the plurality of exhibits;
a data analyzer coupled to the processor, the data analyzer to:
implement a second artificial intelligence component to identify a plurality of rules from a rule record obtained from the plurality of sources, each of the plurality of rules associated with processing the content creation requirement; and
a modeler coupled to the processor, the modeler to:
map the exhibit annotation associated with each of the plurality of exhibits with the plurality of rules and the plurality of content creation attributes to create a plurality of content models, each of the plurality of content models comprising a model layout associated with processing the content creation requirement;
evaluate each of the plurality of content models for congruence with the plurality of rules and the content creation attributes;
based on the evaluation, determine an evaluation score for each of the plurality of content models;
select a content model from amongst the plurality of content models having respective evaluation scores above a threshold evaluation score; and
initiate a content creation action based on the selected content model to address the content creation requirement.

2. The system as claimed in claim 1, wherein the modeler is to:
analyze visual saliency features of each of the plurality of content models; and
determine an aesthetic value of each of the plurality of content models based on the analysis of the visual saliency features of each of the plurality of content models.

3. The system as claimed in claim 2, wherein the modeler is to analyze the visual saliency features based on a neural network trained with visual saliency data to determine the aesthetic value.

4. The system as claimed in claim 2, wherein the modeler is to determine the threshold evaluation score based on evaluating the aesthetic value of each of the plurality of content models over an evaluation parameter, the evaluation parameter indicative of visual saliency of each of the plurality of content models.

5. The system as claimed in claim 4, wherein the modeler is to:
  ascertain whether a rule from among the plurality of rules has been updated;
  ascertain whether a content creation attribute from among the plurality of content creation attributes has been updated; and
  modify the threshold evaluation score based on at least one of an updated content creation attribute and an updated rule.

6. The system as claimed in claim 2, wherein the modeler is to further determine, for each of the plurality of content models, presence of a readability support indicator as a factor in determining the evaluation score, the readability support indicator including one of an accessibility indicator for color-blind users, a color contrast indicator, and a readability indicator.

7. The system as claimed in claim 1, wherein the data segmenter is to parse each of the plurality of exhibits with a pre-configured annotation library to identify the exhibit annotation associated with each of the plurality of exhibits.

8. A method comprising:
  receiving, by a processor, a content creation requirement from a user;
  obtaining, by the processor, a content record from a plurality of sources pertaining to the processing of the content creation requirement; and
  implementing, by the processor, a first artificial intelligence component to:
    identify a plurality of content creation attributes from the plurality of sources preponderant to processing the content creation requirement;
    classify the content record into a plurality of exhibits, each of the plurality of exhibits comprising a display trait from the content record; and
    identify an exhibit annotation associated with each of the plurality of exhibits;
  implementing, by the processor, a second artificial intelligence component to identify a plurality of rules from a rule record obtained from the plurality of sources, each of the plurality of rules associated with processing the content creation requirement; and
  mapping, by the processor, the exhibit annotation associated with each of the plurality of exhibits with the plurality of rules and the plurality of content creation attributes to create a plurality of content models, each of the plurality of content models comprising a model layout associated with processing the content creation requirement;
  evaluating, by the processor, each of the plurality of content models for congruence with the plurality of rules and the content creation attributes;
  based on the evaluation, determining, by the processor, an evaluation score for each of the plurality of content models;
  selecting, by the processor, a content model from amongst the plurality of content models having respective evaluation scores above a threshold evaluation score; and
  initiating, by the processor, a content creation action based on the selected content model to address the content creation requirement.

9. The method as claimed in claim 8, wherein the method further comprises:
  analyzing, by the processor, visual saliency features of each of the plurality of content models; and
  determining, by the processor, an aesthetic value of each of the plurality of content models based on the analysis of the visual saliency features of each of the plurality of content models.

10. The method as claimed in claim 9, wherein the method further comprises analyzing, by the processor, the visual saliency features based on a neural network trained with visual saliency data to determine the aesthetic value.

11. The method as claimed in claim 9, wherein the method further comprises determining, by the processor, the threshold evaluation score based on evaluating the aesthetic value of each of the plurality of content models over an evaluation parameter, the evaluation parameter indicative of visual saliency of each of the plurality of content models.

12. The method as claimed in claim 11, wherein the method further comprises:
  ascertaining, by the processor, whether a rule from among the plurality of rules has been updated;
  ascertaining, by the processor, whether a content creation attribute from among the plurality of content creation attributes has been updated; and
  modifying, by the processor, the threshold evaluation score based on at least one of an updated content creation attribute and an updated rule.

13. The method as claimed in claim 9, wherein the method further comprises determining, by the processor, for each of the plurality of content models, presence of a readability support indicator as a factor in determining the evaluation score, the readability support indicator including one of an accessibility indicator for color-blind users, a color contrast indicator, and a readability indicator.

14. The method as claimed in claim 8, wherein the method further comprises parsing, by the processor, each of the plurality of exhibits with a pre-configured annotation library to identify the exhibit annotation associated with each of the plurality of exhibits.

15. A non-transitory computer-readable medium including machine readable instructions that are executable by a processor to:
  receive a content creation requirement from a user;
  obtain a content record from a plurality of sources pertaining to processing of the content creation requirement;
  implement a first artificial intelligence component to:
    identify a plurality of content creation attributes from the plurality of sources preponderant to processing the content creation requirement;
    classify the content record into a plurality of exhibits, each of the plurality of exhibits comprising a display trait from the content record; and
    identify an exhibit annotation associated with each of the plurality of exhibits;
  implement a second artificial intelligence component to identify a plurality of rules from a rule record obtained from the plurality of sources, each of the plurality of rules associated with processing the content creation requirement; and
  map the exhibit annotation associated with each of the plurality of exhibits with the plurality of rules and the plurality of content creation attributes to create a plurality of content models, each of the plurality of content models comprising a model layout associated with processing the content creation requirement;
  evaluate each of the plurality of content models for congruence with the plurality of rules and the content creation attributes;

based on the evaluation, determine an evaluation score for each of the plurality of content models;

select a content model from amongst the plurality of content models having respective evaluation scores above a threshold evaluation score; and initiate a content creation action based on the selected content model to address the content creation requirement.

16. The non-transitory computer-readable medium of claim 15, wherein the processor is to:

analyze visual saliency features of each of the plurality of content models; and determine an aesthetic value of each of the plurality of content models based on the analysis of the visual saliency features of each of the plurality of content models.

17. The non-transitory computer-readable medium of claim 16, wherein the processor is to analyze the visual saliency features based on a neural network trained with visual saliency data to determine the aesthetic value.

18. The non-transitory computer-readable medium of claim 16, wherein the processor is to determine the threshold evaluation score based on evaluating the aesthetic value of each of the plurality of content models over an evaluation parameter, the evaluation parameter indicative of visual saliency of each of the plurality of content models.

19. The non-transitory computer-readable medium of claim 18, wherein the processor is to:

ascertain whether a rule from among the plurality of rules has been updated;

ascertain whether a content creation attribute from among the plurality of content creation attributes has been updated; and modify the threshold evaluation score based on at least one of an updated content creation attribute and an updated rule.

20. The non-transitory computer-readable medium of claim 16, wherein the processor is to determine, for each of the plurality of content models, presence of a readability support indicator as a factor in determining the evaluation score, the readability support indicator including one of an accessibility indicator for color-blind users, a color contrast indicator, and a readability indicator.

* * * * *